(12) United States Patent
Qiu et al.

(10) Patent No.: US 11,677,695 B2
(45) Date of Patent: *Jun. 13, 2023

(54) INFORMATION PROCESSING APPARATUS, AND NON-TRANSITORY COMPUTER READABLE MEDIUM

(71) Applicant: FUJIFILM Business Innovation Corp., Tokyo (JP)

(72) Inventors: Qianru Qiu, Kanagawa (JP); Jun Shingu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,148

(22) Filed: Jan. 2, 2022

(65) Prior Publication Data

US 2022/0124058 A1    Apr. 21, 2022

Related U.S. Application Data

(63) Continuation of application No. 16/211,170, filed on Dec. 5, 2018, now Pat. No. 11,245,651.

(30) Foreign Application Priority Data

Mar. 15, 2018  (JP) .............................. JP2018-048448
Aug. 10, 2018  (JP) .............................. JP2018-151363

(51) Int. Cl.
    *G06F 15/16*     (2006.01)
    *H04L 51/046*    (2022.01)

(52) U.S. Cl.
     CPC .................................. *H04L 51/046* (2013.01)

(58) Field of Classification Search
     CPC ........................... H04L 51/046; H04L 51/043
     USPC ............................................................ 709/206
     See application file for complete search history.

(56) References Cited

U.S. PATENT DOCUMENTS

| | | | |
|---|---|---|---|
| 8,793,322 B2* | 7/2014 | Beardsmore | H04L 12/66 709/204 |
| 8,843,580 B2* | 9/2014 | Beardsmore | H04L 51/214 709/206 |
| 9,237,231 B2* | 1/2016 | Swanburg | H04L 51/18 |
| 9,450,898 B2* | 9/2016 | Kurupacheril | G06Q 10/109 |
| 10,331,303 B1* | 6/2019 | Gurtin | G06F 3/0482 |
| 10,623,359 B1* | 4/2020 | Rosenstein | G06F 40/284 |
| 2008/0147774 A1* | 6/2008 | Tummalapenta | H04L 51/234 709/202 |
| 2011/0078167 A1* | 3/2011 | Sundaresan | G06F 40/30 707/765 |
| 2011/0145822 A1* | 6/2011 | Rowe | G06Q 10/10 718/100 |

(Continued)

*Primary Examiner* — Anthony Mejia
(74) *Attorney, Agent, or Firm* — JCIPRNET

(57) ABSTRACT

An information processing apparatus includes a receiving unit that receives an operation, using a character string that is specified by multiple messages included in a predetermined topic selected by a user, from the user to register a task that involves one or more users, and a display controller that displays, as information on the task registered when the receiving unit receives the operation from the user, the information that is a combination of the specified character string and a predetermined character string that is identified based on the specified character string or the messages.

18 Claims, 17 Drawing Sheets

(56) References Cited

U.S. PATENT DOCUMENTS

| | | | |
|---|---|---|---|
| 2011/0219315 A1* | 9/2011 | Bier | G06F 40/106 |
| | | | 715/752 |
| 2013/0007749 A1* | 1/2013 | Chi | G06Q 10/06 |
| | | | 718/100 |
| 2015/0370774 A1* | 12/2015 | Mason | G06F 8/70 |
| | | | 715/224 |
| 2016/0301639 A1* | 10/2016 | Liu | H04L 51/52 |
| 2016/0342571 A1* | 11/2016 | Lane | H04W 4/18 |
| 2018/0095940 A1* | 4/2018 | Meixner | H04L 51/046 |
| 2019/0180739 A1* | 6/2019 | Raja | G06F 40/35 |
| 2019/0288965 A1* | 9/2019 | Qiu | H04L 51/046 |
| 2021/0049556 A1* | 2/2021 | Kishi | G06Q 50/265 |

\* cited by examiner

FIG. 5-1A

| TOPIC ID | MANAGER ID | USER ID LIST | CONTENTS OF TOPIC |
|---|---|---|---|
| 1 | 103 | 101, 102, 103 | PATENT |
| 2 | 102 | 101, 102, 103, 104 | THESIS |

FIG. 5-1B

| MESSAGE ID | TOPIC ID | USER ID | CONTENTS OF MESSAGE |
|---|---|---|---|
| 1 | 1 | 101 | WHEN DO WE HAVE NEXT REVIEW MEETING? |
| 2 | 1 | 102 | WHAT ABOUT SEPTEMBER 7 (THURSDAY)? |
| 3 | 2 | 102 | DEADLINE IS SEPTEMBER 7 |
| 4 | 2 | 101 | PRESENTATION WILL BE HELD ON SEPTEMBER 16. |
| 5 | 2 | 101 | FILE APPLICATION FOR PRESENTATION OUTSIDE FIRM SHOULD BE DONE BEFORE SUBMITTING THESIS. |
| 6 | 2 | 102 | SUBMIT DOCUMENT TO INTELLECTUAL PROPERTY DEPARTMENT. |

FIG. 5-2

| TASK ID | TOPIC ID | MESSAGE ID LIST | PERSON-IN-CHARGE ID | REQUESTER ID | TASK STATUS | CONTENTS OF TASK |
|---|---|---|---|---|---|---|
| 1 | 1 | 1, 2 | 101 | 102 | PROCESS COMPLETED | PATENT REVIEW MEETING ON SEPTEMBER 7 (THURSDAY) |
| 2 | 2 | 3, 4 | 101 | 101 | PENDING | DEADLINE FOR THESIS IS SEPTEMBER 7. PRESENTATION IS ON SEPTEMBER 16. |
| 3 | 2 | 5, 6 | 103 | 101 | PENDING | APPLICATION FOR PRESENTATION OUTSIDE FIRM. SUBMIT DOCUMENT TO INTELLECTUAL PROPERTY DEPARTMENT. DEADLINE: SEPTEMBER 1. |
| 4 | 2 | 5, 6 | 104 | 101 | PENDING | APPLICATION FOR PRESENTATION OUTSIDE FIRM. SUBMIT DOCUMENT TO INTELLECTUAL PROPERTY DEPARTMENT. DEADLINE: SEPTEMBER 1. |

INFORMATION PROCESSING APPARATUS, AND NON-TRANSITORY COMPUTER READABLE MEDIUM

CROSS-REFERENCE TO RELATED APPLICATIONS

This application is a continuation of U.S. patent application Ser. No. 16/211,170, filed on Dec. 5, 2018, now allowed, which claims the priority benefits of Japan Patent Application No. 2018-048448, filed on Mar. 15, 2018 and Japan Patent Application No. 2018-151363, filed on Aug. 10, 2018. The entirety of each of the above-mentioned patent applications is hereby incorporated by reference herein and made a part of this specification.

BACKGROUND

(i) Technical Field

The present invention relates to an information processing apparatus, and a non-transitory computer readable medium.

(ii) Related Art

In chatting, messages are exchanged with respect to a predetermined topic. The messages may include one related to a user's task. Registering a task involving the user is difficult in related art using a character string specified by multiple messages.

SUMMARY

According to an aspect of the invention, there is provided an information processing apparatus. The information processing apparatus includes a receiving unit that receives an operation, using a character string that is specified by multiple messages included in a predetermined topic selected by a user, from the user to registers a task that involves one or more users, and a display controller that displays, as information on the task registered when the receiving unit receives the operation from the user, the information that is a combination of the specified character string and a predetermined character string that is identified based on the specified character string or the messages.

BRIEF DESCRIPTION OF THE DRAWINGS

Exemplary embodiment of the present invention will be described in detail based on the following figures, wherein:

FIG. 5-1A and FIG. 5-1B illustrate examples of information stored on a topic database (DB), and a message DB;

FIG. 5-2 illustrates an example of information stored on a task DB;

FIG. 6-1A and FIG. 6-1B illustrate examples of a chat screen;

FIG. 6-2A and FIG. 6-2B illustrate examples of the chat screen;

FIG. 10-1A and FIG. 10-1B illustrate specific examples of a process to register the task in accordance with a message;

FIG. 10-2A and FIG. 10-2B illustrate specific examples of a process to register the task in accordance with the message;

FIG. 10-3A and FIG. 10-3B illustrate specific examples of a process to register the task in accordance with the message;

DETAILED DESCRIPTION

Embodiment of the present invention is described in detail with reference to the drawings.

Figure 1:
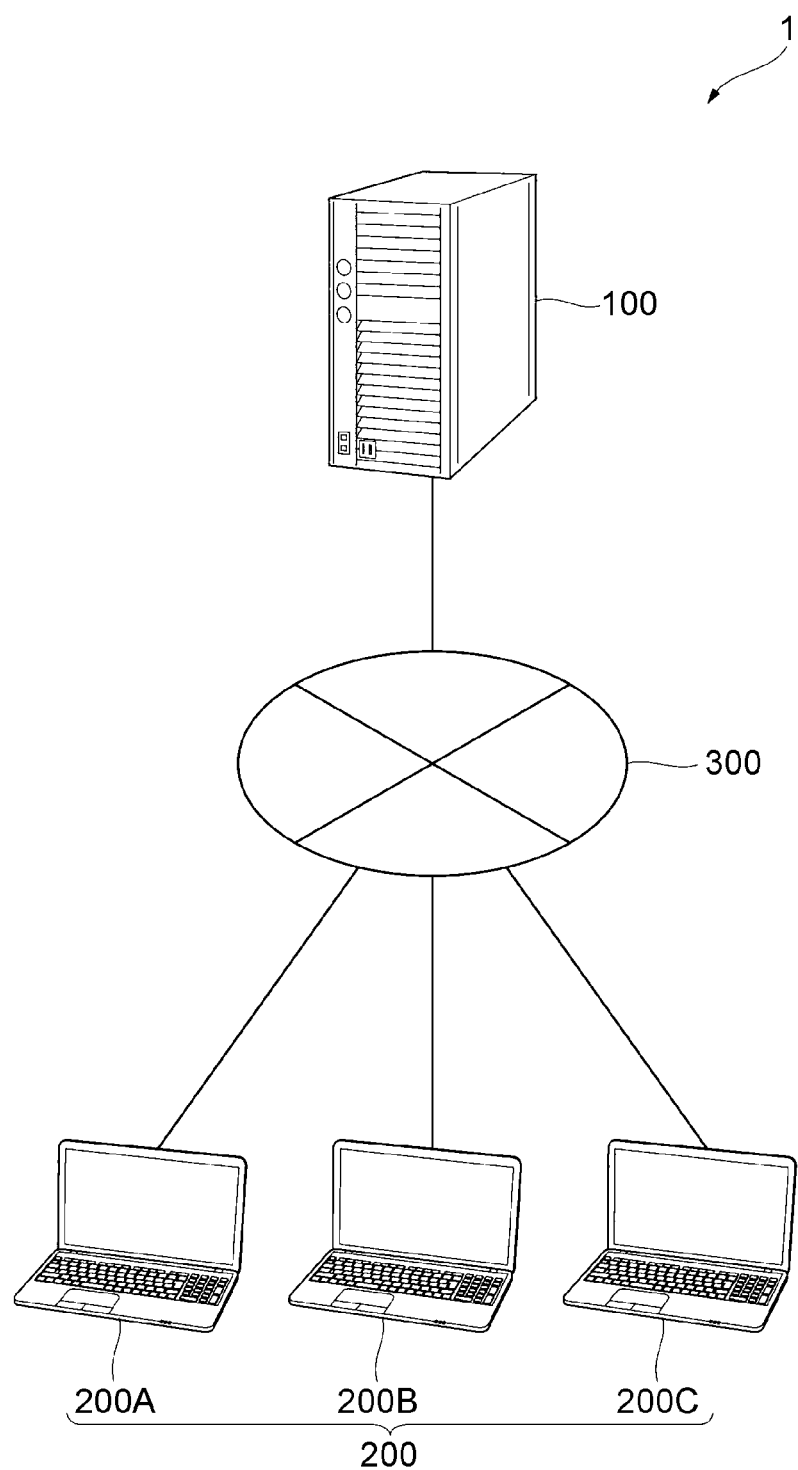
FIG. 1 illustrates a whole configuration of an electronic chat system of an exemplary embodiment.

The whole configuration of an electronic chat system 1 of the exemplary embodiment is described. FIG. 1 illustrates the whole configuration of the chat system 1 of the exemplary embodiment. As illustrated in FIG. 1, the chat system 1 includes a server apparatus 100 and operation terminals 200A through 200C. The server apparatus 100 and the operation terminals 200A through 200C are connected to a network 300.

FIG. 1 illustrates the operation terminals 200A through 200C. If the operation terminals 200A through 200C are not discriminated from each other, they may be collectively referred to as an operation terminal 200. In the example of FIG. 1, three operation terminals 200 are illustrated, but the number of operation terminals is not limited to three.

The server apparatus 100 is a computer that provides a chat system that allows multiple operation terminals 200 to exchange messages. The server apparatus 100 may be a personal computer (PC), a workstation, or the like. Upon receiving a message from the operation terminal 200, the server apparatus 100 stores the message. The server apparatus 100 transmits the received message to the operation terminal 200 serving as a destination of the message.

The operation terminal 200 is an example of an information processing apparatus, and is a computer, such as a PC, an information processing terminal or the like, which is provided for a user to operate. The operation terminal 200 displays a screen on which messages exchanged in the chat system 1 are presented (hereinafter referred to as a chat screen) in a chronological order. The chat screen is displayed in response to the user who uses the chat system 1.

More specifically, when the user logs in on the chat system 1 or starts up an application of the chat system 1, the chat screen responsive to the user is displayed. When the user enters a message on the operation terminal 200, the operation terminal 200 transmits the entered message to the server apparatus 100. The operation terminal 200 additionally displays the message transmitted to the server apparatus 100 on the chat screen as a new message. If the operation terminal 200 receives a message from the server apparatus 100, the operation terminal 200 additionally displays the received message on the chat screen as a new message.

The network 300 is a communication system that is used for communication between the server apparatus 100 and the operation terminal 200. For example, the operation terminal 200 is the Internet, a public telephone network, or a local area network (LAN).

In accordance with the exemplary embodiment, the chat system 1 thus constructed registers a task in accordance with the message. More specifically, the task is registered in accordance with a character string of the message specified by the user. The task is work to be performed by the user. For example, the task includes a meeting, producing materials, and submitting materials. The task is assigned to a person in charge thereof. Each user may confirm the information on the task which he or she is in charge of.

Figure 2:
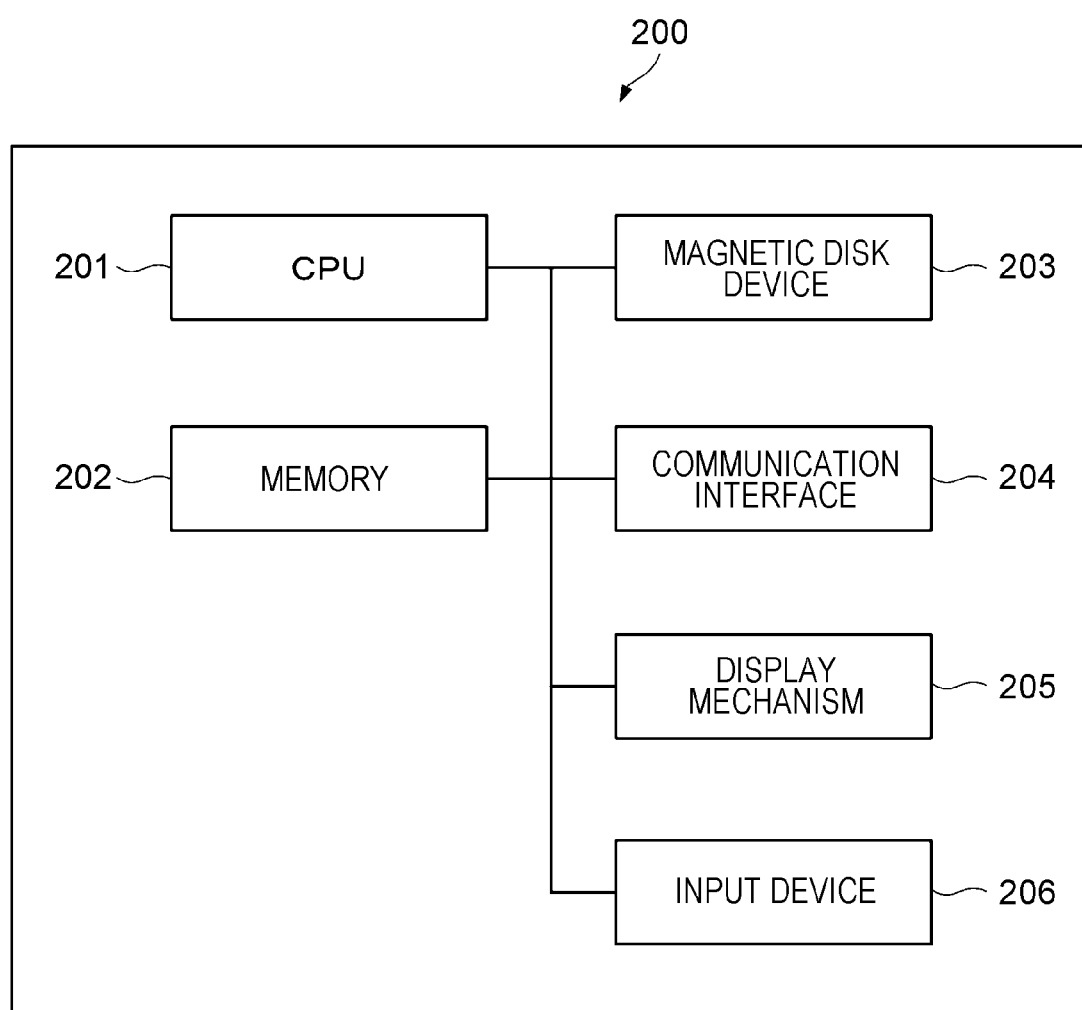
FIG. 2 illustrates a hardware configuration of an operation terminal of the exemplary embodiment.

A hardware configuration of the operation terminal 200 of the exemplary embodiment is described below. FIG. 2 illustrates the hardware configuration of the operation terminal 200 of the exemplary embodiment.

Referring to FIG. 2, the operation terminal 200 includes a central processing unit (CPU) 201 serving as an arithmetic unit, a memory 202, and a magnetic disk device 203. The CPU 201 executes a variety of programs including an operating system (OS), and applications. The memory 202 serves as a memory area that stores the variety of programs and data that is used to execute the programs. The magnetic disk device 203 serves as a memory area that stores the variety of programs, data that is input with respect to the programs, and data that is output from the programs. The CPU 201 implements functionalities of the operation terminal 200 by loading the programs stored on the magnetic disk device 203 onto the memory 202, and executing the programs.

The operation terminal 200 includes a communication interface (communication I/F) 204 for communication with the outside, a display mechanism 205 including a video memory and a display, and an input device 206 including a keyboard, a mouse, and/or a touch panel. In accordance with the exemplary embodiment, the display mechanism 205 is an example of a display.

The server apparatus 100 may be identical in hardware configuration to the operation terminal 200 of FIG. 2.

Figure 3:
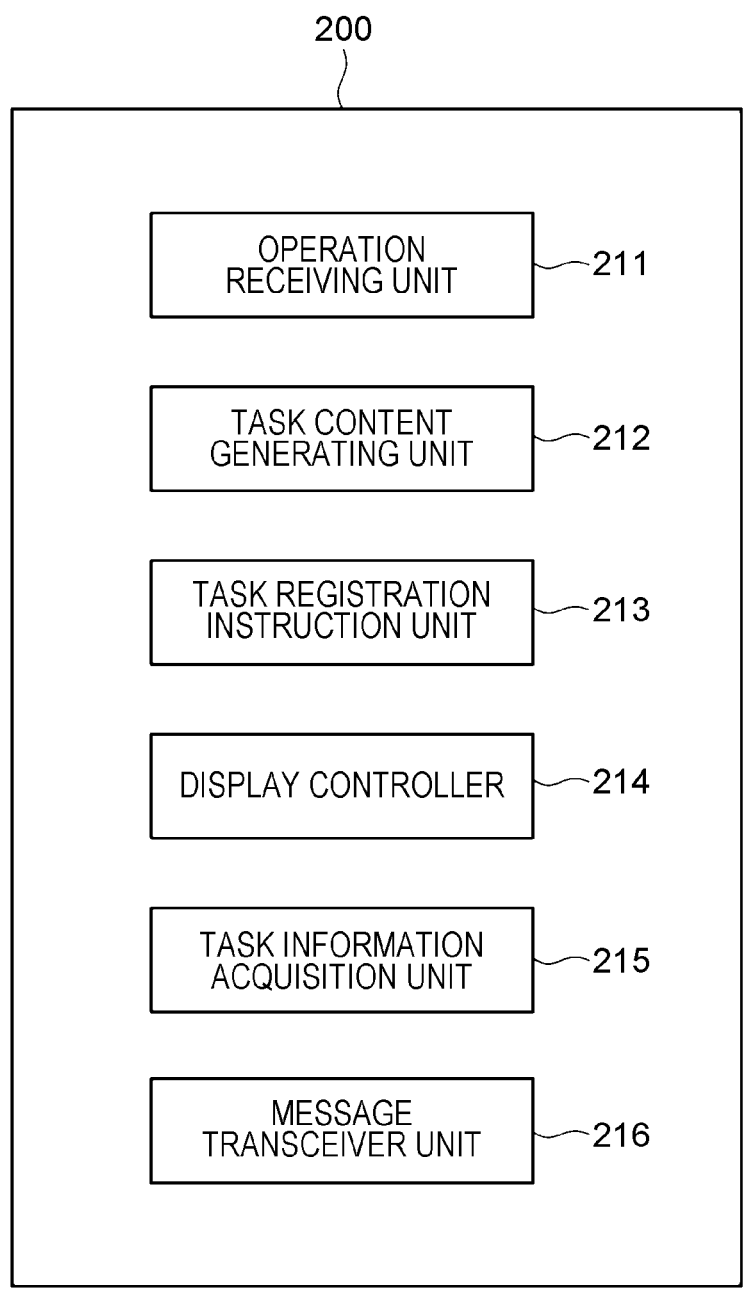
FIG. 3 is a functional block diagram illustrating the operation terminal of the exemplary embodiment.

The functional configuration of the operation terminal 200 of the exemplary embodiment is described below. FIG. 3 is a functional block diagram illustrating the operation terminal 200 of the exemplary embodiment. The operation terminal 200 includes an operation receiving unit 211, a task content generating unit 212, a task registration instruction unit 213, a display controller 214, a task information acquisition unit 215, and a message transceiver unit 216.

The operation receiving unit 211 receives an operation performed on a mouse or a touch panel by the user. For example, the operation receiving unit 211 receives an operation to start up an application on the chat system 1. More specifically, a user identifier (ID) is assigned to each user of the chat system 1 to uniquely identify the user. For example, when the user registers with the chat system 1, the server apparatus 100 assigns a user ID to the user. Alternatively, the user ID may be assigned to each operation terminal 200 such that the user is identified in accordance with the operation terminal 200.

With the application starting on the chat system 1, the operation receiving unit 211 is ready to receive an operation to produce a topic that serves as a subject while messages are exchanged, an operation to input a message, or an operation to transmit a message to the server apparatus 100. As will be described in detail, the operation receiving unit 211 receives an operation which registers a task which one or more users are in charge of, using a character string specified in a message about a topic (predetermined subject).

Upon receiving an operation to register a task on the operation receiving unit 211, the task content generating unit 212 generates contents of the task to be registered (task contents). More specifically, the task content generating unit 212 identifies a predetermined character string in accordance with a character string specified in the task registration or in accordance with a message including that character string. The predetermined character string is a character string that is added as the contents of the task. The task content generating unit 212 generates, as the task contents, information that is a combination of the specified character string and the predetermined character string. The process of generating the task contents is described in detail below.

The task content generating unit 212 generates the task contents, and then the task registration instruction unit 213 instructs the server apparatus 100 to register the task. The task registration instruction includes the task contents generated by the task content generating unit 212, the information on the message serving as a basis for the task registration, and the information on the user who has given the task registration instruction.

The display controller 214 outputs data that is used to cause the display of the display mechanism 205 to display the chat screen, and controls the displaying on the display. Displayed on the chat screen are a message of each topic, and information on a task that is registered based on the message.

The task information acquisition unit 215 acquires the information on the task registered on the server apparatus 100. The information on the task acquired herein is notified by the task information notification unit 117, and includes the contents of the registered task, the user ID of a user in charge of the task (hereinafter referred to as a person-in-charge ID), the user ID of a user who has given the registration instruction (hereinafter referred to as a requester ID).

The message transceiver unit 216 transmits or receives a message to or from the server apparatus 100. Each functionality of the operation terminal 200 is implemented when software and hardware resources operate in concert with each other. More specifically, when the operation terminal 200 is implemented using the hardware configuration of FIG. 2, the OS and application programs stored on the magnetic disk device 203 or the like are read onto the memory 202, and executed by the CPU 201. This implements the functionalities of the operation receiving unit 211, the task content generating unit 212, the task registration instruction unit 213, the display controller 214, the task information acquisition unit 215, and the message transceiver unit 216, and the like.

In accordance with the exemplary embodiment, the operation receiving unit 211 serves as an example of a receiving unit, a selection operation receiving unit, or a registration operation receiving unit. The display controller 214 serves as an example of a display controller.

Figure 4:
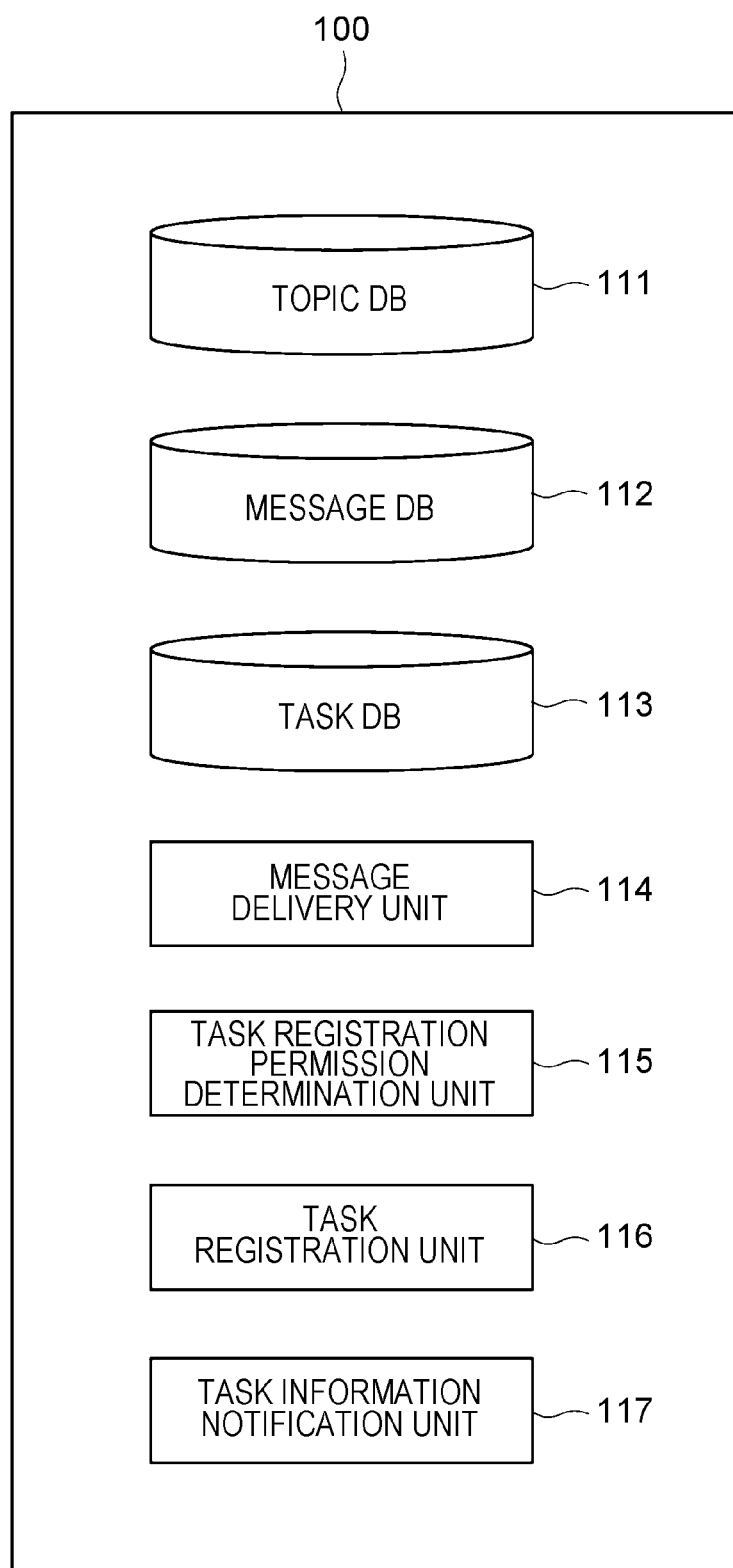
FIG. 4 is a functional block diagram illustrating a server apparatus of the exemplary embodiment.

The functional configuration of the server apparatus 100 of the exemplary embodiment is described below. FIG. 4 is a functional block diagram illustrating the server apparatus 100 of the exemplary embodiment. The server apparatus 100 of the exemplary embodiment includes a topic database (DB) 111, a message DB 112, a task DB 113, a message delivery unit 114, a task registration permission determination unit 115, a task registration unit 116, and a task information notification unit 117.

The topic DB 111 stores information on a topic registered on the chat system 1. In the topic DB 111, a unique topic ID is assigned to each topic for identification. For example, when a topic is generated via a user's operation, a topic ID may be assigned to the topic by the server apparatus 100 or the like.

The message DB 112 stores information on a message that the message delivery unit 114 has received from the operation terminal 200. A unique message ID is assigned to each message for identification on the message DB 112. When a message is transmitted from the operation terminal 200, the server apparatus 100 or the like assigns a unique message ID to each message.

The task DB 113 stores information on a task registered by the task registration unit 116. A unique task ID is assigned to each task for identification. For example, when the task registration unit 116 registers a task, a task ID is assigned to the task.

Upon receiving a message from the operation terminal 200, the message delivery unit 114 stores the received message onto the message DB 112. Also, the message delivery unit 114 transmits the received message to the operation terminal 200 of the user as a message destination (the operation terminal 200 operated by the user serving as the destination).

The task registration permission determination unit 115 receives a task registration instruction from the task registration instruction unit 213 in the operation terminal 200, and determines whether to permit the task to be registered. In this case, based on information on the task registration instruction received from the operation terminal 200, the task registration permission determination unit 115 determines whether a condition to permit the task to be registered (hereinafter referred to as a registration permit condition) is satisfied. If the registration permit condition is satisfied, the task registration permission determination unit 115 permits the task to be registered.

More specifically, the registration permit condition serves as a condition that determines, based on a relationship with a registered task, whether to permit the registration. For example, if a task having the same message ID and person-in-charge ID as a registration-instructed task is present among the registered tasks, the task registration permission determination unit 115 determines that the registration permit condition is not satisfied. For example, a task registration instruction of a person-in-charge ID "101" may be issued based on messages having message IDs "1", and "2". If the task having the person-in-charge ID "101" with the message IDs "1" and "2" has been registered, the task registration permission determination unit 115 determines that the registration permit condition is not satisfied, and then inhibits the registration.

The registration permit condition is not limited to such a condition. For example, a task having the same message ID and person-in-charge ID as those of a registration-instructed task has been registered, but that task may have a different requester ID. In such a case, the task registration permission determination unit 115 determines that the registration permit condition is satisfied, and may permit the task to be registered. There is a case that the message IDs and the person-in-charge IDs fail to fully match each other. For example, if a registered task has a message ID, part of which is identical to the message ID of the registration-instructed task, and has a person-in-charge ID, part of which is identical to the person-in-charge ID of the registration-instructed task, the task registration permission determination unit 115 determines that the registration permit condition is not satisfied, and may inhibit the registration.

If the task registration permission determination unit 115 permits the task to be registered, the task registration unit 116 registers the task. The task registration unit 116 assigns a new task ID to the task, and stores the information on the registration-instructed task on the task DB 113. More specifically, the task ID, the message ID, the person-in-charge ID, the requester ID, and the information on the task contents are stored on the task DB 113.

The task information notification unit 117 notifies the operation terminal 200 of the information on the task registered by the task registration unit 116. For example, the task information notification unit 117 notifies the operation terminal 200 of the information including the task contents, the person-in-charge ID, and the requester ID.

As with the case of the operation terminal 200, the CPU in the server apparatus 100 reads an OS and application programs from a magnetic disk or the like onto a memory, and executes the OS and application programs. The server apparatus 100 thus implements the functionalities of the message delivery unit 114, the task registration permission determination unit 115, the task registration unit 116, and the task information notification unit 117. The topic DB 111, the message DB 112, and the task DB 113 may be implemented by a memory, such as a magnetic disk device.

The generation process of the task contents performed by the task content generating unit 212 is described below. As previously described, the task content generating unit 212 identifies a predetermined character string, based on a character string specified during the registration of the task, or the message of the character string. The task content generating unit 212 generates the task contents by combining the specified character string and the identified predetermined character string. According to a rule formulated in advance, the task content generating unit 212 identifies the predetermined character string. This process is described below with reference to a specific example.

The task content generating unit 212 identifies as the predetermined character string the name of a topic to which the message of the character string specified by the user belongs. For example, the character string "September 7 deadline" in the message reading "Deadline is September 7" of the topic "thesis" may now be specified by the user. In such a case, the task content generating unit 212 identifies a predetermined character string "thesis" as the name of the topic as a character string associated with the message reading "deadline is September 7". The task content generating unit 212 combines the specified character string "Deadline is September 7" with the identified predetermined character string "thesis", thereby generating task contents as "Deadline for thesis is September 7".

If the name of the topic is included in the specified character string, the task content generating unit 212 may not necessarily have to identify the name of the topic as the predetermined character string. For example, if the character string "Thesis presentation is on September 16" is specified, the word "thesis" that is the name of the topic is included. In such a case, the task content generating unit 212 does not combine the character string of the name of the topic "thesis" and then generates "Thesis presentation is on September 16" as the task contents.

If part or whole of the specified character string is a specific character string, a character string corresponding to the specific character string may be identified as the predetermined character string. For example, a character string "application" may now be associated with a character string "confirmation of application destination" in advance. If the user specifies "application for presentation outside firm", for example, the task content generating unit 212 determines that the specific character string "application" is included in the specified character string "application for presentation outside firm". The task content generating unit 212 then identifies as the predetermined character string the character string "confirmation of application destination" corresponding to "application". The task content generating unit 212 combines the character string "application for presentation outside firm" specified by the user with the identified predetermined character string "confirmation of application destination", thereby generating the task contents "Application for presentation outside firm. Confirmation of application destination."

If a specific character string is not included in the character string specified by the user, a character string associated with the specific character string may be identified as the predetermined character string. For example, the character string expressing time and date may be associated in advance with "confirmation of deadline". In this case, for example, if the character string "submit document to intellectual property department" is specified by the user, the task content generating unit 212 determines that the character string indicating time and date is not included in the specified character string "submit document to intellectual property department". The task content generating unit 212 thus identifies as the predetermined character string the character string "confirmation of deadline" corresponding to the character string indicating time and date. Also, the task content generating unit 212 combines the character string "submit document to intellectual property department" and the identified predetermined character string "confirmation of deadline", thereby generating the task contents "Submit document to intellectual property department. Confirmation of deadline."

In this way, the task content generating unit 212 identifies the predetermined character string in accordance with a rule formulated in advance. The predetermined character string is a character string that is added as the contents of the task. As described above, the predetermined character string is a character string that is not included in the character string specified during the registration of the task. The specified character string and the predetermined character string are combined to generate the task contents.

The rule to identify the predetermined character string is not limited to the rule described above. The task content generating unit 212 may simply identify the predetermined character string, based on the character string specified during the task registration or the message including the specified character string. In such a case, any rule may be used.

An administrator of the chat system 1 may determine which rule is to be used. For example, the rule in use may be changed on a per topic basis, or may be changed depending on a requester who registers the task, or the number of characters of the specified character string. Using multiple rules, multiple predetermined character strings may be identified to generate the task contents. A rule may be automatically added in response to an operation applied by the user in the past. For example, when the user generates a task, based on a message that does not include a character string indicating time and date, the user may add the character string "confirmation of deadline". In such a case, if the character string indicating time and date is not included in the character string specified by the user, an automatically added rule may identify, as the predetermined character string, the character string "confirmation of deadline".

Figures 1A, 6:
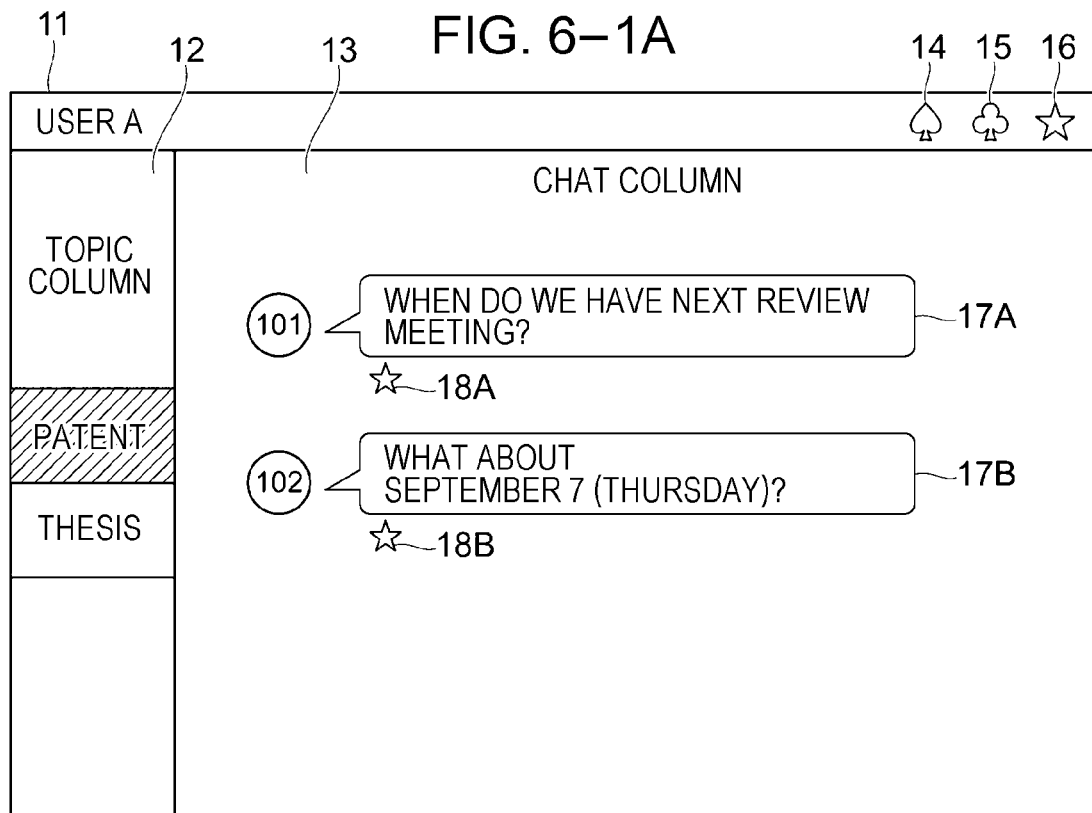
Figures 1B, 6:
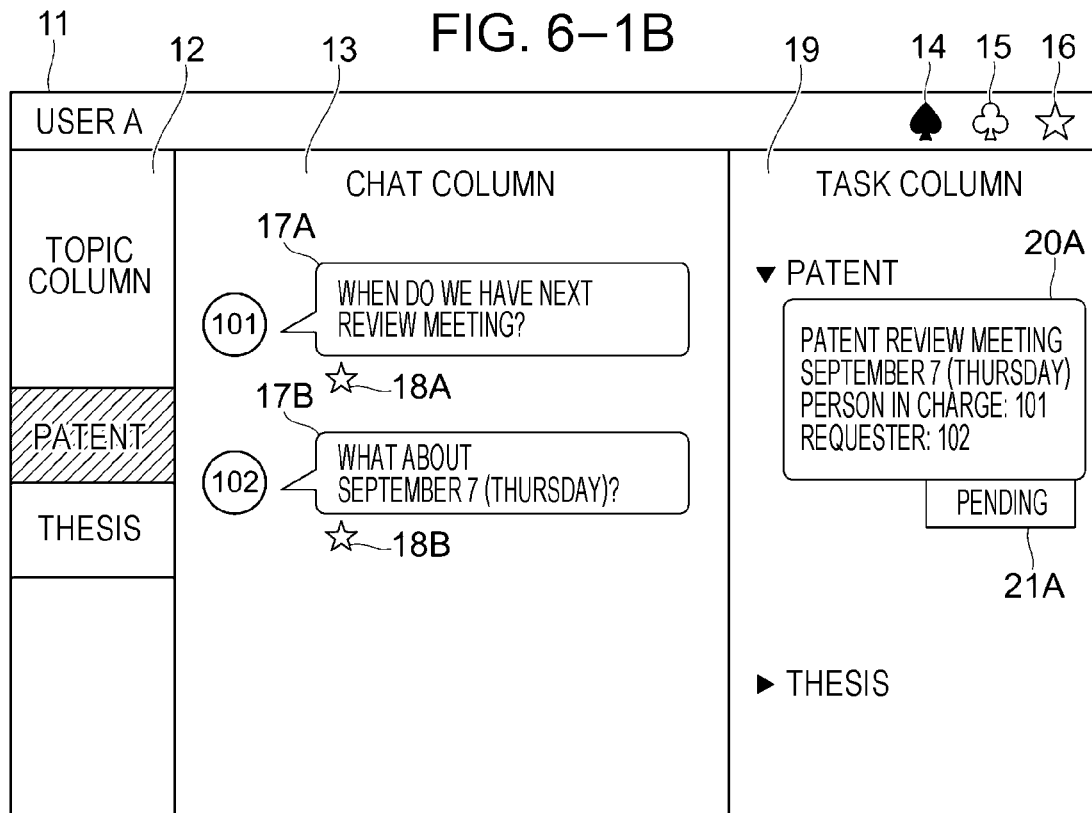

Information stored on each database is described below. FIG. 5-1A and FIG. 5-1B illustrate examples of information stored on the topic DB 111 and the message DB 112. FIG. 5-2 illustrates an example of information stored on the task DB 113.

The topic DB 111 is described first. Referring to FIG. 5-1A, the topic DB 111 stores, on a per topic basis, items of information for a "topic ID", a "manager ID", a "user ID list", and "contents of topic".

The "topic ID" is assigned to each topic. The "manager ID" is a user ID of a user who is a manager of the topic. In other words, during the generation of a topic, a user who serves as a manager managing the topic is designated. The user ID of the designated user is stored as the manager ID.

The "user ID list" is a list of user IDs of users as participants in the topic. Like the manager, the participants in the topic are assigned to each topic when the topic is generated. The user IDs of the users assigned to the topic are stored in the user ID list. A participant may be added after the generation of the topic. If a participant is added, the user ID of the added participant is newly added in the user ID list. The "contents of the topic" are input by a user when the topic is generated.

The message DB 112 is described below. The message DB 112 stores, on a per topic basis, information on items for a "message ID", a "topic ID", a "user ID", and "contents of message" as illustrated in FIG. 5-1B.

The "message ID" is assigned to each message. The "topic ID" is an ID of the topic to which the message belongs. The "user ID" is the ID of a user who has entered the message. The "contents of the message" are contents of messages entered by the user.

The task DB 113 is described below. Referring to FIG. 5-2, the task DB 113 stores, on a per task basis, information on items for a "task ID", a "topic ID", a "message ID list", a "person-in-charge ID", a "requester ID", a "task status", and "contents of task".

The "task ID" is assigned on a per task basis. Note that the "task ID" is assigned to each person in charge (on a per person-in-charge ID basis). For example, when a task having multiple users as persons in charge is registered, a task ID is assigned to each person in charge. The "topic ID" is an ID of a topic to which the message serving as a basis for the task registration belongs.

The "message ID list" is a list of message IDs of the messages that serve as a basis for the task registration. The "person-in-charge ID" is a user ID of a person who is in charge of the task. The person in charge of the task is designated when the task is registered. The user ID of the designated user is stored as the person-in-charge ID. The "requester ID" is an ID of a user who has instructed the task to be registered.

The "task status" is a progress status of the task. More specifically, when the task is registered, the task status is "pending". When the person in charge of the task has performed and completed the task, the person in charge of the task enters the completion of the task. The inputting of the completion of the task changes the task status from "pending" to "process completed". When the manager of the topic has confirmed (approved) the "process completed", the manager enters confirmation. Via the entry of the confirmation, the task status changes from "process completed" to "approval completed". In this way, the progress status is managed on each task.

The contents of task ("task contents") are generated by the task content generating unit 212 in the server apparatus 100. As described below, if the task contents are edited by the user, the edited task contents are stored.

A chat screen displayed on the operation terminal 200 is described below. FIG. 6-1A, FIG. 6-1B, FIG. 6-2A, and FIG. 6-2B illustrate chat screens when a user A operates an operation terminal 200A to start up an application of the chat system 1.

Referring to FIG. 6-1A, a chat screen 11 includes two regions, namely, a topic column 12 and a chat column 13. The upper portion of the chat screen 11 includes buttons for the task, namely, an individual task button 14, an all-member task button 15, and a mark display button 16. If one of these buttons is selected, display control responsive to each selected button is performed.

The name of the topic is displayed in the topic column 12. The name displayed is the "contents of the topic" stored on the topic DB 111. As illustrated, two topics "patent" and "thesis" are registered, and the topic "patent" is now selected.

The chat column 13 displays a message of the selected topic. More specifically, the chat column 13 displays a message posted by a user participating in the selected topic. Furthermore, from among the messages posted about the selected topic, the chat column 13 displays as a display target a message having a size that the chat column 13 is able to accommodate. In accordance with the exemplary embodiment, the chat column 13 is an example of a predetermined display region.

Referring to FIG. 6-1A, messages 17A and 17B are displayed as messages of the topic "patent". The message 17A is posted by the user having a user ID "101", and the message 17B is posted by the user having a user ID "102". In this example, the user ID "101" is assigned to a user A, and the user ID "102" is assigned to a user B.

Each message has a mark button such that the user may mark individual messages. The marked message is displayed in a mark column 22 (see FIG. 6-2B). In the example illustrated, the message 17A is associated with a mark button 18A, and the message 17B is associated with a mark button 18B.

Figures 2A, 6:
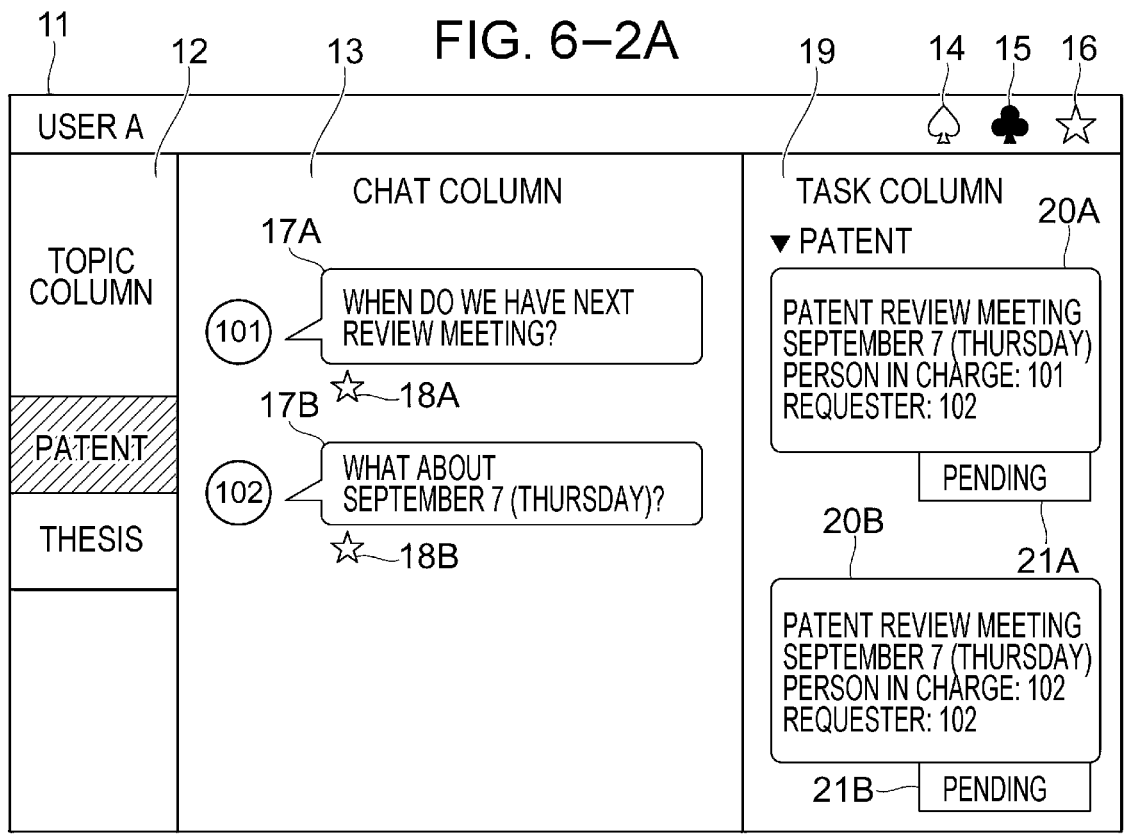
Figures 2B, 6:
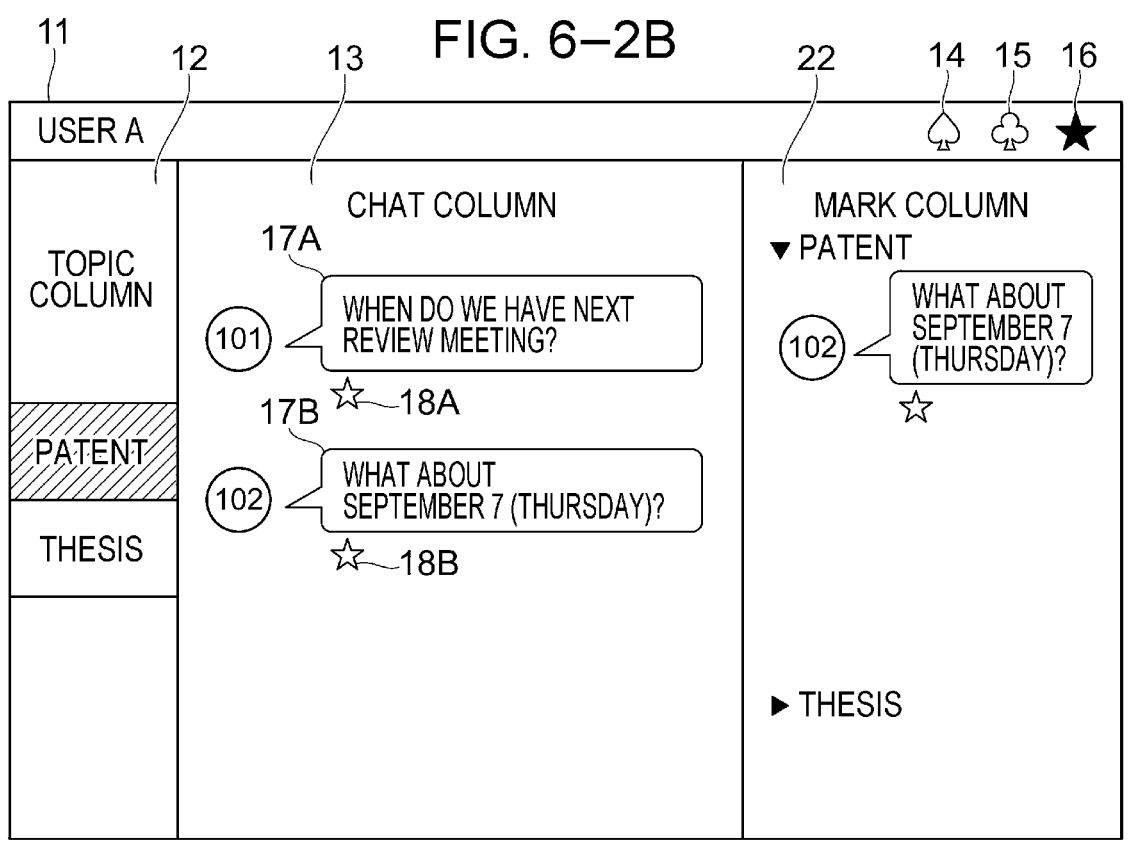

FIG. 6-1B illustrates an example of the chat screen 11 when an individual task button 14 is selected. FIG. 6-2B illustrates an example of the chat screen 11 when an all-member task button 15 is selected. Referring to FIG. 6-1B and FIG. 6-2B, a task column 19 is newly arranged when the individual task button 14 or the all-member task button 15 is selected. Information on the task concerning the selected topic is displayed on the task column 19.

If the individual task button 14 is selected, the information on the task which the user himself or herself (the user A in this case) is in charge of is displayed with respect to the selected topic. In the example of FIG. 6-1B, the task column 19 displays a task image 20A indicating the information on the task which the user A is in charge of with respect to the topic "patent". The task image 20A indicates that the contents of task are "patent review meeting on September 7 (Thursday)", person-in-charge ID "101", and requester ID "102".

If the task contents in the task column 19 are selected, the chat column 13 displays a message (character string) that serves as a basis for the task. For example, if the user A selects the task image 20A, character strings of the message 17A and the message 17B that serve as a basis for the task of the task image 20A may be highlighted, or in particular, character strings "review meeting", and "September 7 (Thursday)" from among the character strings may be highlighted. Highlighting is a display method to stress displaying by setting a background color of the character string to be different from a color of a surrounding area or a background color of another character string. If the message in the chat column 13 is further selected, the task column 19 displays the information on the task that has been registered based on the selected message.

Each task image in the task column 19 includes a status column. The status column displays information on the "task status" on the task DB 113. When the person in charge of the task or the manager modifies or enters the status in the status column, the information on the "task status" on the task DB 113 is modified, and the display in the status column is also modified. In the illustrated example, a status column 21A of the task image 20A indicates that the task status is "pending".

If the all-member task button 15 is selected, information on the tasks of all members is displayed with respect to the selected topic. As illustrated in FIG. 6-2A, the task column 19 displays, as all tasks of participants in the topic "patent", a task image 20A indicating information on a task which the user A (with the user ID "101") is in charge of and a task image 20B indicating information on a task which the user B (with a user ID "102") is in charge of.

FIG. 6-2B illustrates an example of the chat screen 11 when the mark display button 16 is selected. When the mark display button 16 is selected, a new mark column 22 is arranged. The mark column 22 displays information on a message marked by the user. In the illustrated example, the same message as the message 17B marked by the user A is displayed in the mark column 22 with respect to the topic "patent".

The chat column 13 and the task column 19 may display the message on the chat column 13 in association with information on the task related to the message. For example, the task column 19 displays information on the task registered based on the message being displayed (generated) on the chat column 13 with a priority higher than information on another task. More specifically, the message on the chat column 13 and the information on the task registered based on that message are displayed in juxtaposition.

The display in the chat column 13 may be scrolled. In concert with the message scrolling up or down in the chat column 13, the information on the task is scrolled up or down in the task column 19. Similarly, the display in the task column 19 may be scrolled. In concert with the image on the task scrolling up or down in the task column 19, the message is scrolled up or down in the chat column 13.

If a task is registered based on multiple messages, another message may be present between the multiple messages. The task registered based on the multiple messages may be handled as a task related to another message present between the multiple messages. The information on the task and another message are thus displayed in juxtaposition.

Figure 7A:
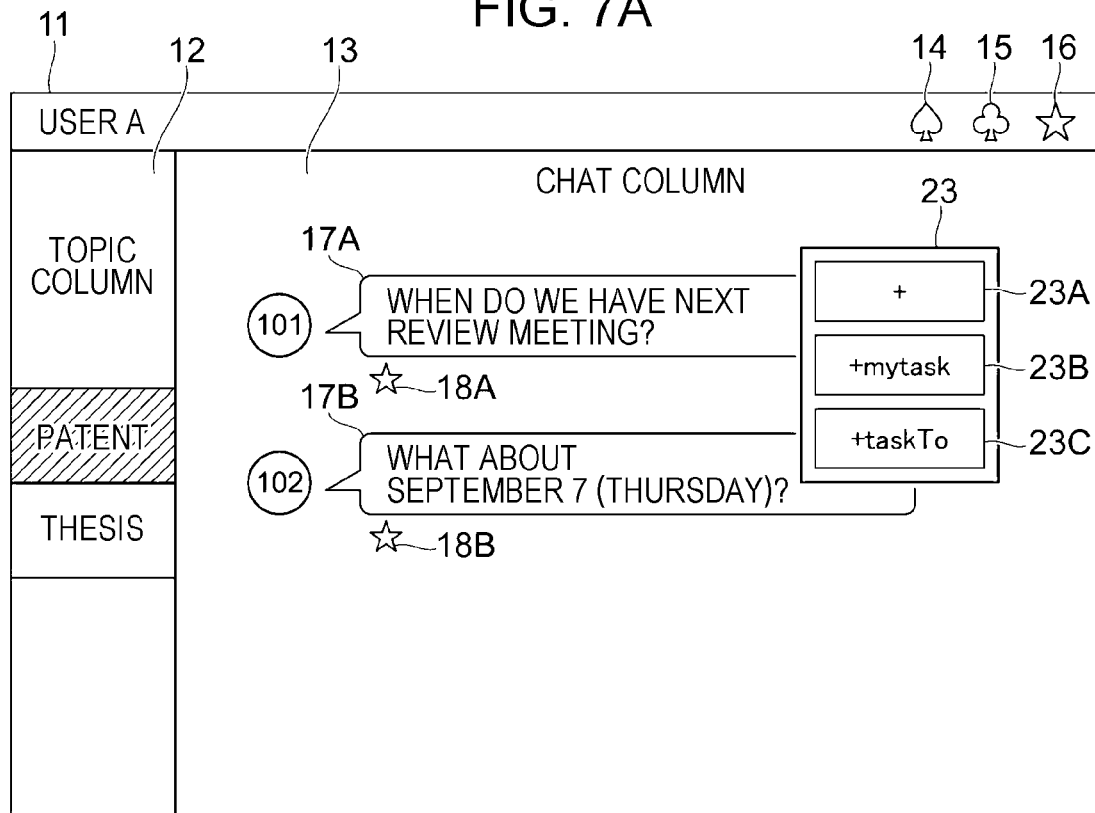
FIG. 7A through FIG. 7C illustrate examples of display when a task is registered.
Figure 7B:
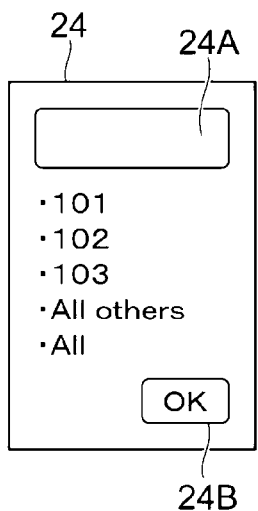
Figure 7C:
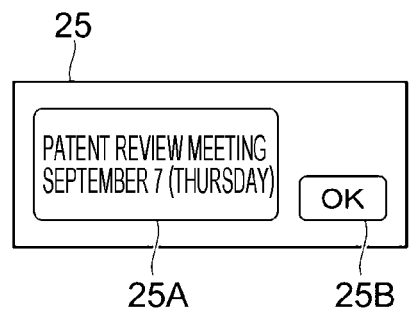

The display to register a task is described below. FIG. 7A through FIG. 7C are examples of the display to register the task.

Referring to FIG. 7A, the user A may now specify a whole message (all character strings included in the message) displayed in the chat column 13 of the chat screen 11, or may now specify a character string included in the message. A task operation menu screen 23 will be displayed.

If the "review meeting" is specified in the message 17A, the task operation menu screen 23 is displayed. The task operation menu screen 23 has a functionality to register a task, and includes a "+" button 23A, a "+mytask" button 23B, and a "+taskTo" button 23C.

The "+" button 23A adds another message in the registration of the task. For example, if the "+" button 23A is selected after the user A specifies the "review meeting" in the message 17A, the message 17B is added. The "+mytask" button 23B is used to register a task which the user operating the chat screen 11 (the user A in this case) is in charge of (hereinafter referred to as an individual task).

The "+taskTo" button 23C is used to register a task which a user participating in the topic is in charge of. If the user A selects the "+taskTo" button 23C, an image 24 receiving a menu selected by a person in charge of the task (hereinafter referred to as a person-in-charge selection menu screen) as illustrated in FIG. 7B. The person-in-charge selection menu screen 24 displays a list of users who participate in the selected topic. If the user A registering a task specifies a user who is going to be in charge of the task on the person-in-charge selection menu screen 24, and selects an "OK" button 24B, the person in charge of the task is thus designated.

"All others" are an item to select a user other than the manager of the topic. "All" is an item to select all users including the manager of the topic. Since the person-in-charge selection menu screen 24 also displays the user ID of the user who is operating the person-in-charge selection menu screen 24, the user may select himself or herself (the user A in this case) as a person in charge of the task. When the character string is entered on a region 24A, the user searching is performed. For example, if part or whole of the user ID is entered in the region 24A, the user ID including entered characters is displayed as search results.

When the "+mytask" button 23B or the "OK" button 24B on the person-in-charge selection menu screen 24 is selected, a screen 25 receiving the editing of the task contents (hereinafter referred to as a task edit menu image) is displayed as illustrated in FIG. 7C. The task edit menu image 25 displays the task contents generated by the task content generating unit 212. In the illustrated example, "Patent review meeting September 7 (Thursday)" is displayed as the task contents in the region 25A. By entering a character string in the region 25A, the task contents may be edited on the task edit menu image 25. The user may edit the task contents as appropriate. If a "OK" button 25B is selected, the task contents are determined, and a task registration instruction is sent to the server apparatus 100.

Figure 8:
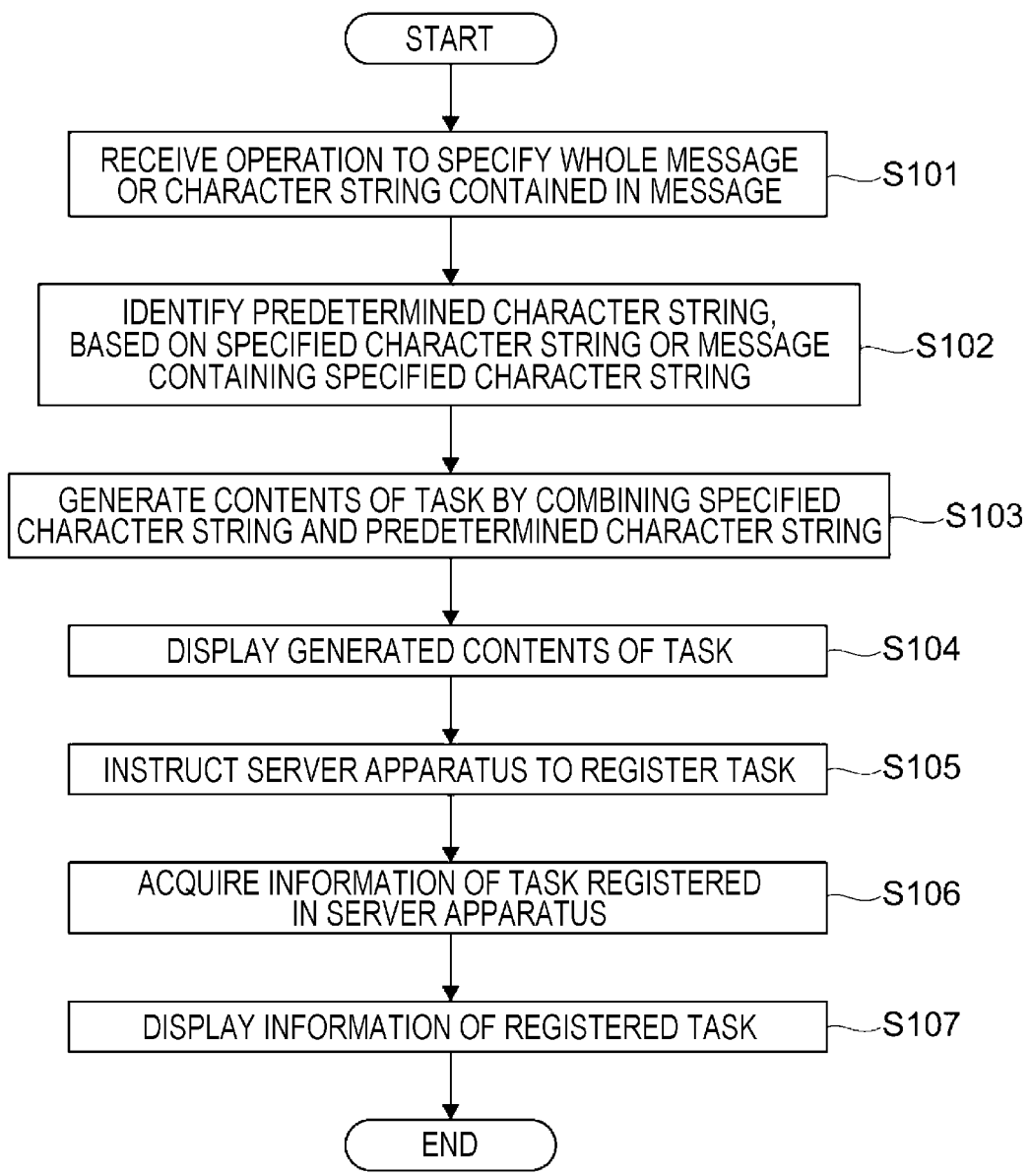
FIG. 8 is a flowchart illustrating an example of a process of the operation terminal when the task is registered.

The process of the operation terminal 200 to register a task is described below. FIG. 8 is a flowchart illustrating an example of the process of the operation terminal 200 when the task is registered.

When a message is displayed in the chat column 13 of the chat screen 11, the operation receiving unit 211 receives an operation that specifies the whole message or a character string included in the message (step S101). Via the user's operation, specifying the whole message or the character string included in the message is performed on one or more messages. Specifying the whole message is interpreted to mean that all the character strings included in the message are specified.

The task content generating unit 212 identifies the predetermined character string, based on the specified character string or the message including the specified character string (step S102). The task content generating unit 212 generates the task contents by combining the character string specified by the user and the identified predetermined character string (step S103).

The display controller 214 displays the generated task contents on the display (step S104). The task contents are edited in response to the user's operation. The task registration instruction unit 213 instructs the server apparatus 100 to register the task (step S105). The task information acquisition unit 215 acquires the information on the task registered on the server apparatus 100 (step S106). The display controller 214 displays the information on the registered task on the display (step S107). The process thus ends.

If the server apparatus 100 does not permit the task to be registered, the task information acquisition unit 215 receives in step S106 from the server apparatus 100 a notification that the task registration is not permitted. The display controller 214 displays on the display the notification that the task registration is not permitted.

Figure 9:
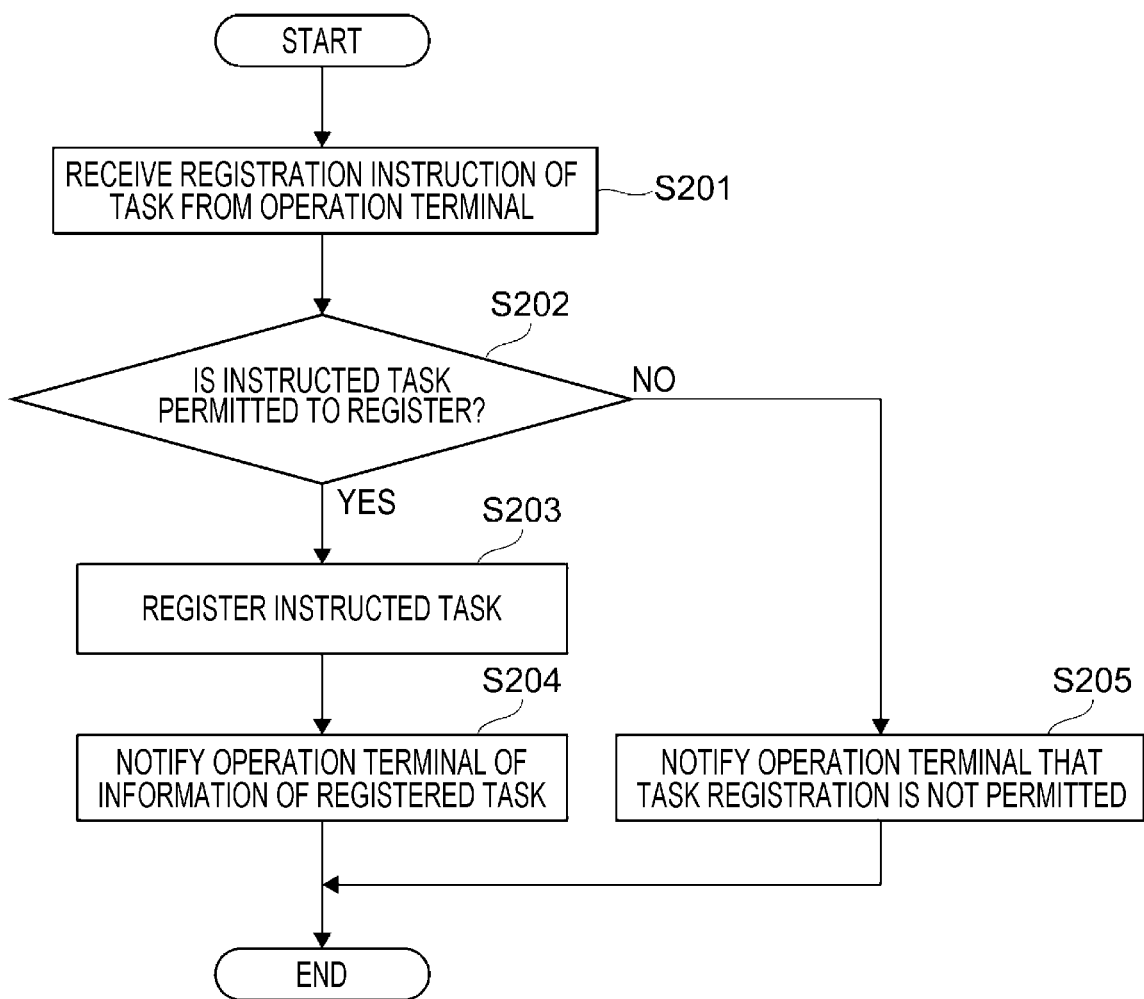
FIG. 9 is a flowchart illustrating an example of a process of a server apparatus when the task is registered.

The process of the server apparatus 100 to register the task is described below. FIG. 9 is a flowchart illustrating an example of the process of the server apparatus 100 when the task is registered.

The task registration permission determination unit 115 receives the task registration instruction from the operation terminal 200 (step S201). The task registration permission determination unit 115 determines whether to permit the task to be registered (step S202).

If the determination in step S202 is affirmative (yes), the task registration unit 116 registers the register-instructed task (step S203). The task registration unit 116 assigns a new task ID to the task, and stores the information on the registration-instructed task on the task DB 113. The task information notification unit 117 notifies the operation terminal 200 of the information on the registered task (step S204).

In step S204, the task information notification unit 117 notifies the information on the task to all participants in the topic to which the message serving as a basis for the registered task belongs. More specifically, the task information notification unit 117 notifies the information on the task to the operation terminals 200 of all participants in the topic. The process thus ends.

If the determination in step S202 is not affirmative (no), the task registration unit 116 does not register the task. The task information notification unit 117 notifies the operation terminal 200 that the task registration is not permitted (step S205). In this case, as well, the task information notification unit 117 notifies the operation terminal 200 of the user who has instructed the task to be registered that the task registration is not permitted. The process thus ends.

Figures 1A, 10:
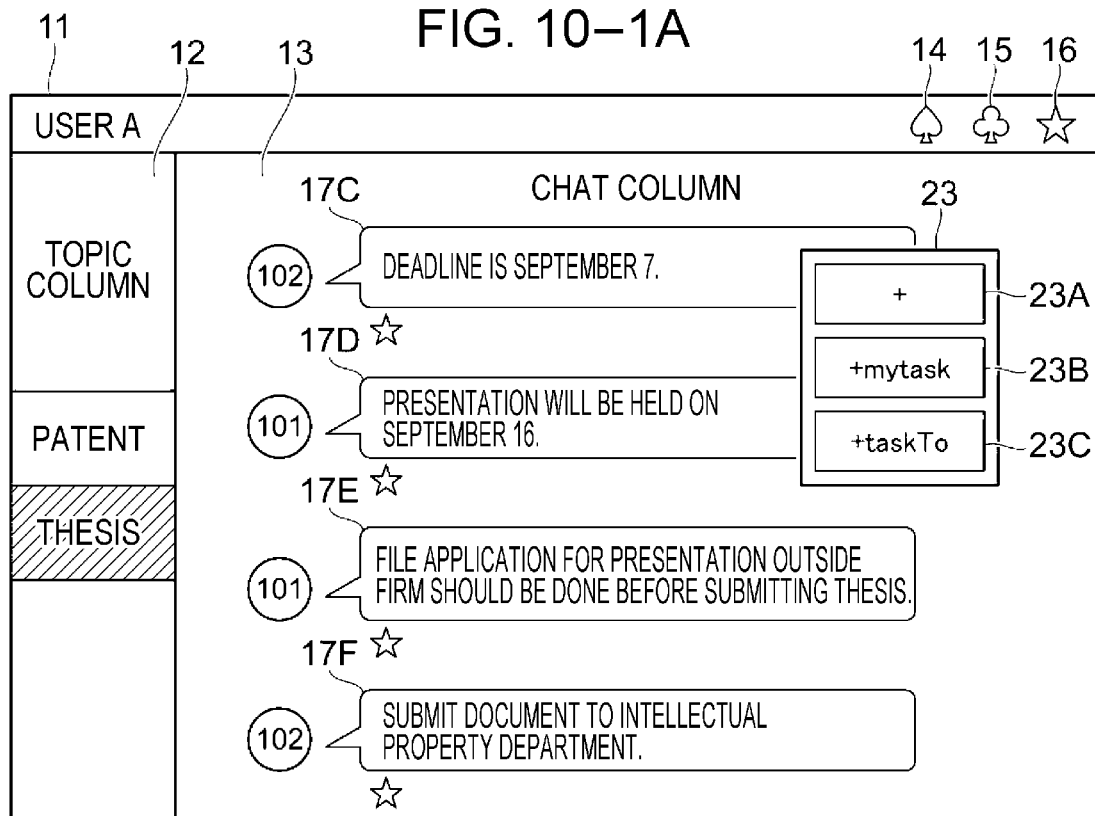
Figures 1B, 10:
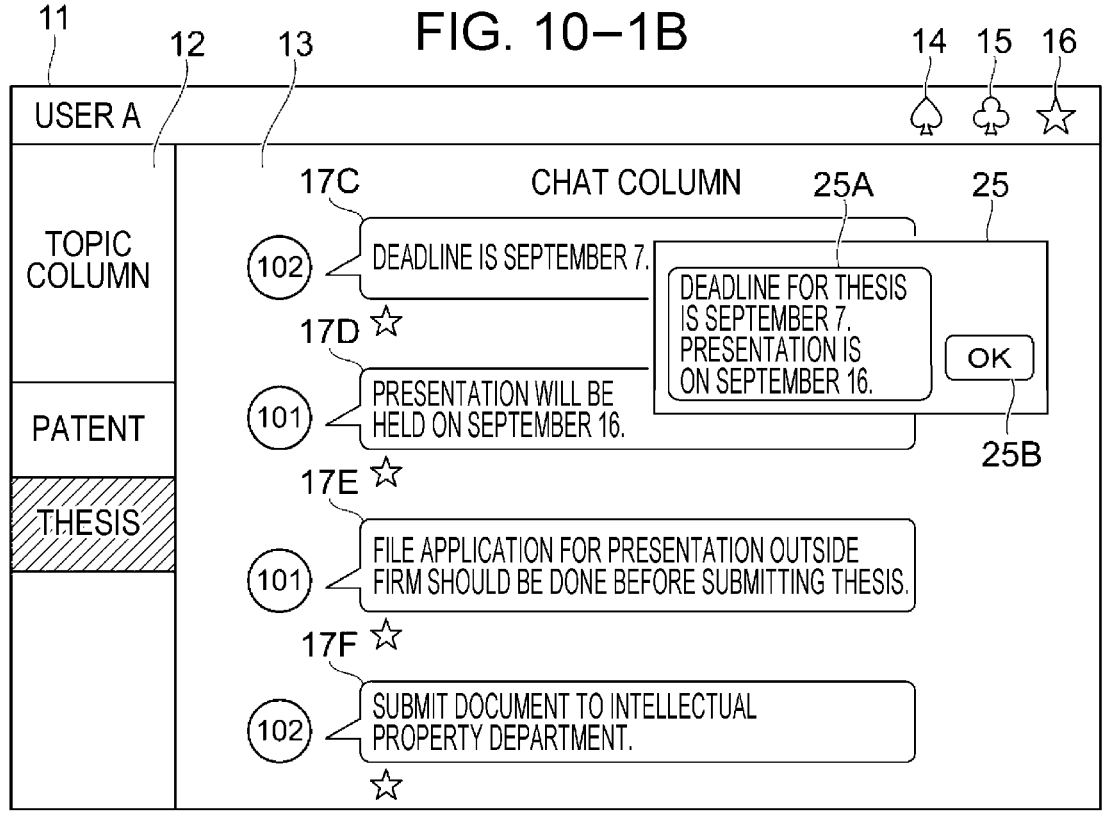
Figures 2A, 10:
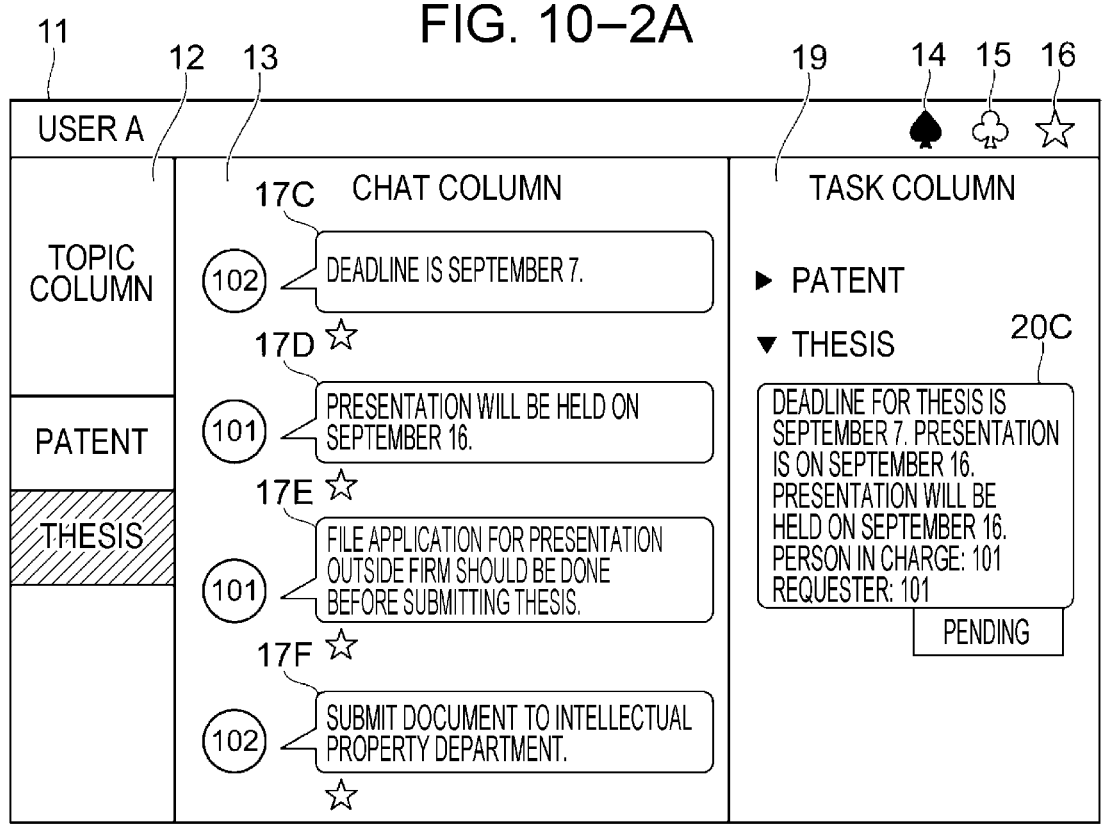
Figures 2B, 10:
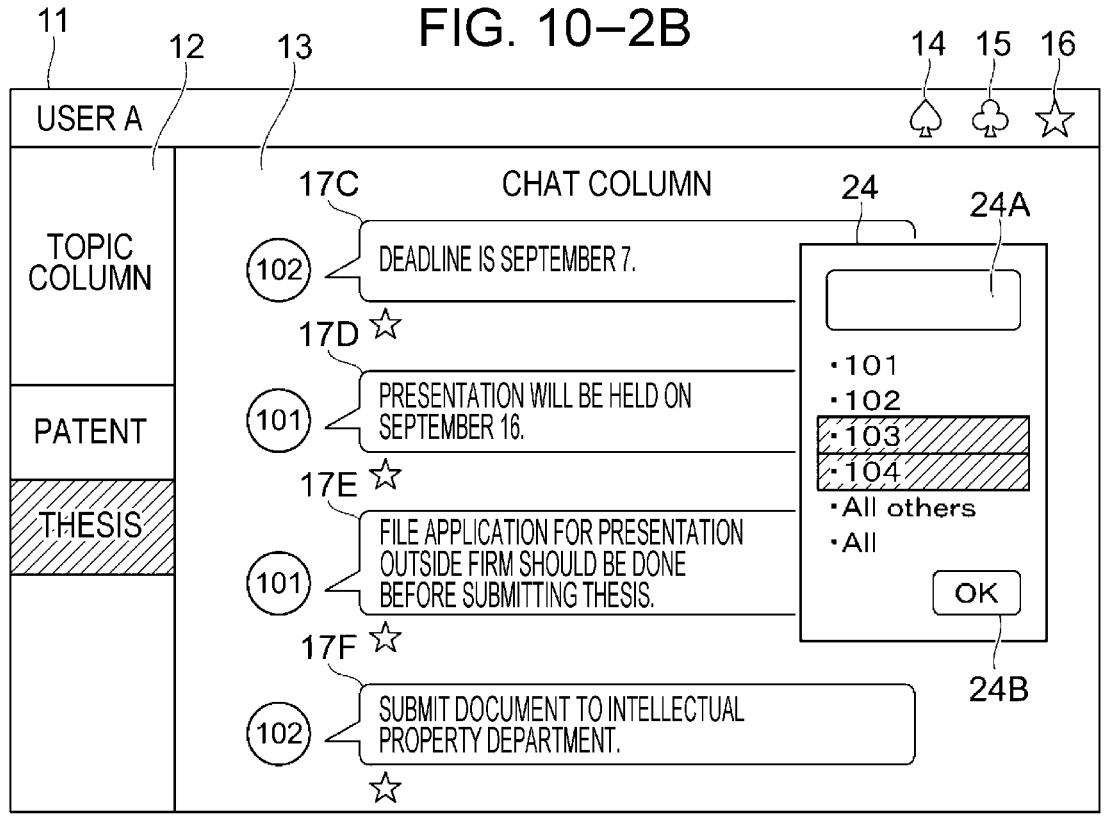
Figures 3A, 10:
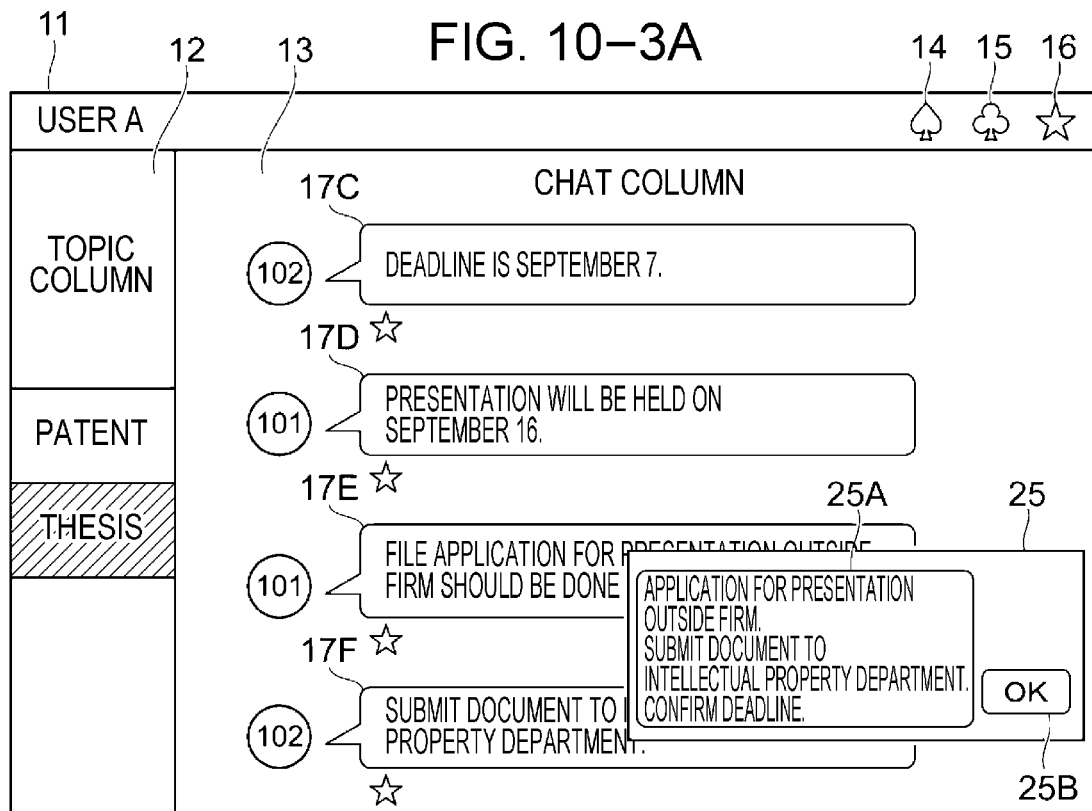
Figures 3B, 10:
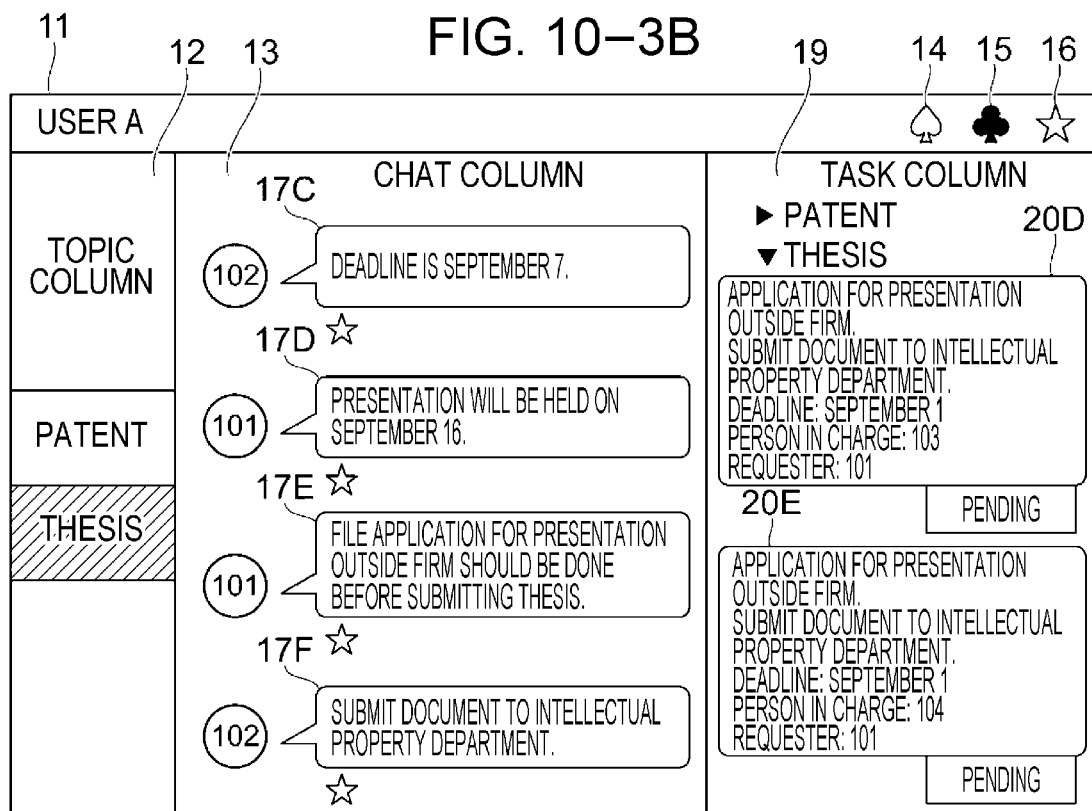

The process of registering the task in accordance with the message is specifically described below. Referring to FIG. 10-1A through FIG. 10-3B, the user A starts up the application of the chat system 1 using an operation terminal 200A.

The chat screen 11 is displayed when the user A starts up the application of the chat system 1. In the example of FIG. 10-1A, the topic "thesis" is selected, and messages 17C through 17F related to the topic "thesis" are displayed in the chat column 13. In order to register a task, the user A may specify the whole of a message or a character string included in the message from among the messages displayed in the chat column 13 on the chat screen 11. The task operation menu screen 23 is thus displayed.

An individual task registration operation with the user A in charge is described below. The "+mytask" button 23B on the task operation menu screen 23 is selected to perform the individual task registration operation.

If the user A specifies the character string "Deadline for thesis is September 7", the character string "Deadline for thesis is September 7" is highlighted, and the task operation menu screen 23 is displayed. If the user A selects the "+" button 23A, a message other than the message 17C may be added. If the user A further specifies the character string "Presentation will be held on September 16" as the message 17D, the character string "Presentation will be held on September 16" is highlighted, and the task operation menu screen 23 is displayed again. If the user A selects the "+mytask" button 23B, the individual task registration operation with the user A in charge is performed.

The task content generating unit 212 generates task contents, based on the specified character strings "Deadline is September 7" and "presentation on September 16". For example, based on the specified character strings "Deadline is September 7" and "presentation on September 16", the task content generating unit 212 identifies the name of the topic "thesis" as the predetermined character string. Also, the task content generating unit 212 adds the name of the topic "thesis" to the specified character strings "Deadline is September 7" and "presentation on September 16", thereby determining the task contents to be "Deadline for thesis is September 7. Presentation is on September 16". As a result, as illustrated in FIG. 10-1B, the task edit menu image 25 is displayed. The user A may edit the task contents as appropriate.

The task registration instruction unit 213 instructs the server apparatus 100 to register the task. The task registration instruction is an instruction for the user A as a person in charge to register the task. More specifically, the task registration instruction is information including the task contents, the topic ID of the topic "thesis", the message IDs for the messages 17C and 17D, the user ID of the user A as a person in charge, and the user ID of the user A as the requester.

When the task registration instruction has been issued, the task registration permission determination unit 115 in the server apparatus 100 determines whether to permit the task registration. In this case, the task registration permission determination unit 115 determines whether the registration permit condition is satisfied, based on the information on the task registration instruction received from the operation terminal 200A. For example, if the message IDs of the messages 17C and 17D are respectively "3", and "4", and the user ID of the user A is "101", the task registration permission determination unit 115 determines whether the task having the message IDs "3" and "4", and the person-in-charge ID "101" is present among the tasks registered on the task DB 113.

If the task having the message IDs "3" and "4", and the person-in-charge ID "101" has been registered, the task registration permission determination unit 115 determines that the registration of the task is not permitted. The task information notification unit 117 notifies the operation terminal 200A that the registration of the task is not permitted. On the other hand, if the task having the message IDs "3" and "4", and the person-in-charge ID "101" has not been registered, the task registration permission determination unit 115 permits the task to be registered. As illustrated in FIG. 5-2A, the task registration unit 116 registers, as a new task, information including a task ID "2", a topic ID "2", message IDs "3", and "4", a person-in-charge ID "101", a requester ID "101", a task status "pending", and task contents "Deadline for thesis is September 7. Presentation is on September 16".

The task information notification unit 117 notifies the operation terminal 200A of the information on the task registered by the task registration unit 116. The notified information on the task is displayed in the task column 19 of the chat screen 11. FIG. 10-2A illustrates task information 20C, as a new task, displaying the task contents "Deadline for thesis is September 7. Presentation is on September 16", the person-in-charge ID "101", and the requester ID "101". If the information on the registered task is displayed on the chat screen 11 for the first time, the information may be highlighted. The information on the task is notified to other users who have participated in the topic "thesis".

The task registration for a user as a person in charge participating in the topic to register a task is described below. The task registration is performed by selecting the "+taskTo" button 23C on the task operation menu screen 23.

When the user A specifies a character string "application for presentation outside firm" of a message 17E, the character string "application for presentation outside firm" is highlighted, and the task operation menu screen 23 is displayed. If the user A selects the "+" button 23A, a message may be added in addition to the message 17E. If the user A specifies a character string "submit document to intellectual property department" of a message 17F, the character string "submit document to intellectual property department" is highlighted, and the task operation menu screen 23 is displayed again.

If the user A selects the "+taskTo" button 23C, the person-in-charge selection menu screen 24 is displayed as illustrated in FIG. 10-2B. The user A may simply select a user in charge of the task. In this example, the user A selects, as persons-in-charge, a user C having a user ID "103", and a user D having a user ID "104".

The task content generating unit 212 generates task contents, based on the specified character strings "application for presentation outside firm" and "submit document to intellectual property department". For example, the task content generating unit 212 identifies a character string "confirm deadline" as the predetermined character string, based on the specified character strings "application for presentation outside firm" and "submit document to intellectual property department". The task content generating unit 212 adds the character string "confirm deadline" to the specified character strings "application for presentation outside firm" and "submit document to intellectual property department", and thus determines, as the task contents, "Application for presentation outside firm. Submit document to intellectual property department. Confirm deadline." As a result, the task edit menu image 25 is displayed as illustrated in FIG. 10-3A, and the user A may edit the task edit menu image 25 as appropriate. For example, the user A edits the character string "confirm deadline" into "September 1 deadline" taking into consideration that the deadline for the thesis is September 7, and that the deadline for the application for the presentation outside the firm is prior to the deadline of for the thesis.

The task registration instruction unit 213 instructs the server apparatus 100 to register the task. The task registration instruction is an instruction for the users C and D as persons in charge to register the task. More specifically, the task registration instruction is information including the task contents, the topic ID of the topic "thesis", the message IDs of the messages 17E and 17F, the user IDs of the users C and D in charge, and the user ID of the user A serving as the requester.

If the task registration instruction has been issued, the task registration permission determination unit 115 in the server apparatus 100 determines whether to permit the task to be registered. If the task registration is permitted, the task registration unit 116 registers, as a new task, information including a task ID "3", a topic ID "2", message IDs "5" and "6", a person-in-charge ID "103", a requester ID "101", a task status "pending", task contents, "Application for presentation outside firm. Submit document to intellectual property department. Deadline: September 1" as illustrated in FIG. 5-2A. The task registration unit 116 further assigns a task ID "4" and similarly registers a task having a person-in-charge ID "104".

The task information notification unit 117 notifies the operation terminal 200A of the information on the task registered by the task registration unit 116. The information on the notified task is displayed in the task column 19 on the chat screen 11. FIG. 10-3B illustrates the chat screen 11 when the all-member task button 15 is selected. Displayed as new tasks are a task screen 20D for a person-in-charge ID "103" and a task screen 20E for a person-in-charge ID "104".

Figure 11A:
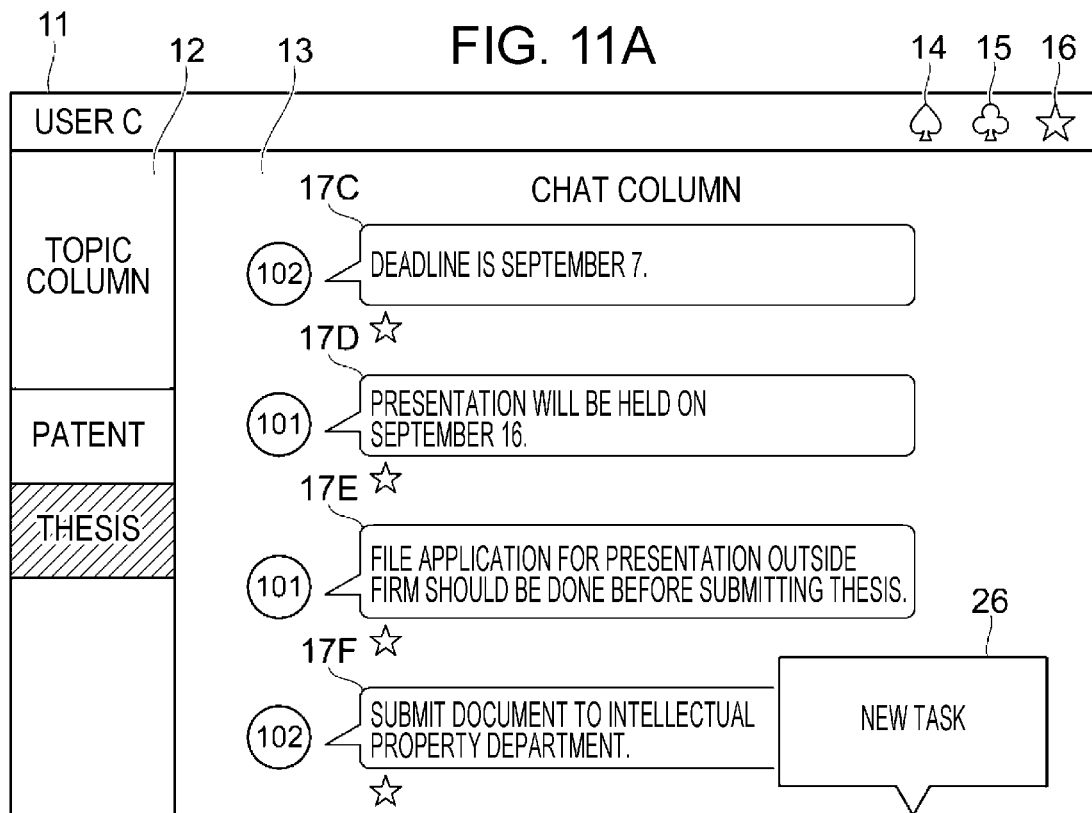
FIG. 11A and FIG. 11B illustrate examples of a notification notifying that a new task is registered.
Figure 11B:
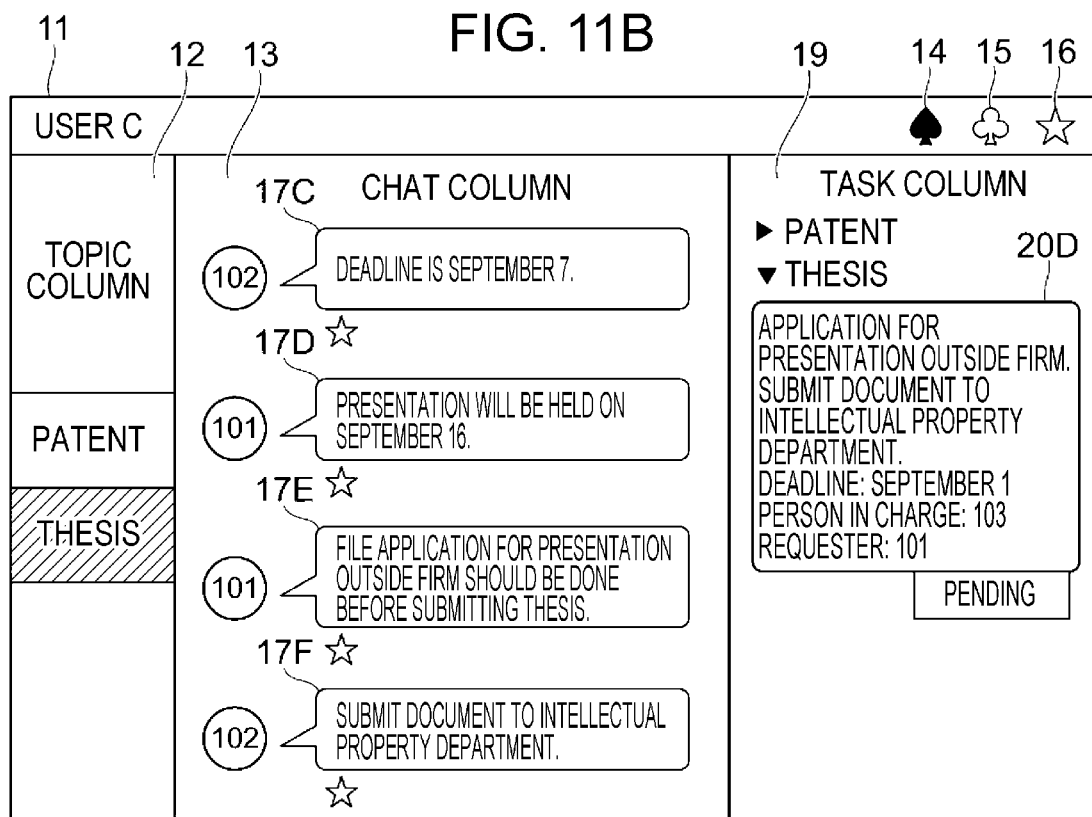

The information on the task is notified to other users who have participated in the topic "thesis". The notification that a new task has been registered is displayed on the chat screen 11 of another user who has been registered as a person in charge. FIG. 11A and FIG. 11B illustrate examples of notifications that a new task has been registered. For example, the user A may now register a task which the users C and D are in charge of. Referring to FIG. 11A, the user C's chat column 13 on the chat screen 11 may display a notification image 26 indicating the presence of a new task. Similarly, a notification indicating the presence of the new task is notified to be displayed on the user D's chat screen 11.

If the user C selects the notification image 26 or the individual task button 14 or the all-member task button 15, information on the newly registered task is displayed. Referring to FIG. 11B, information on a task screen 20D is displayed on the user C's chat screen 11.

A process of managing the progress status of a task is specifically described.

When the task is performed and completed, the person in charge of the task changes the task status from "pending" to "process completed". For example, when the task is completed, the person in charge of the task selects "process completed" in the status column of the task. In this way, the "task status" on the task DB 113 is changed from "pending" to "process completed". "Process completed" is displayed in the status column.

The manager for the topic selects the all-member task button 15 to verify the status of each task. Since all tasks related to the topic are displayed in the task column 19, the manager checks whether a task with "process completed" is present among the tasks. The task with "process completed" may be displayed with a background color different from a background color of another task. The manager then selects "approval completed". In this way, the "task status" on the task DB 113 is changed from "process completed" to "approval completed", and "approval completed" is displayed in the status column.

Figure 12A:
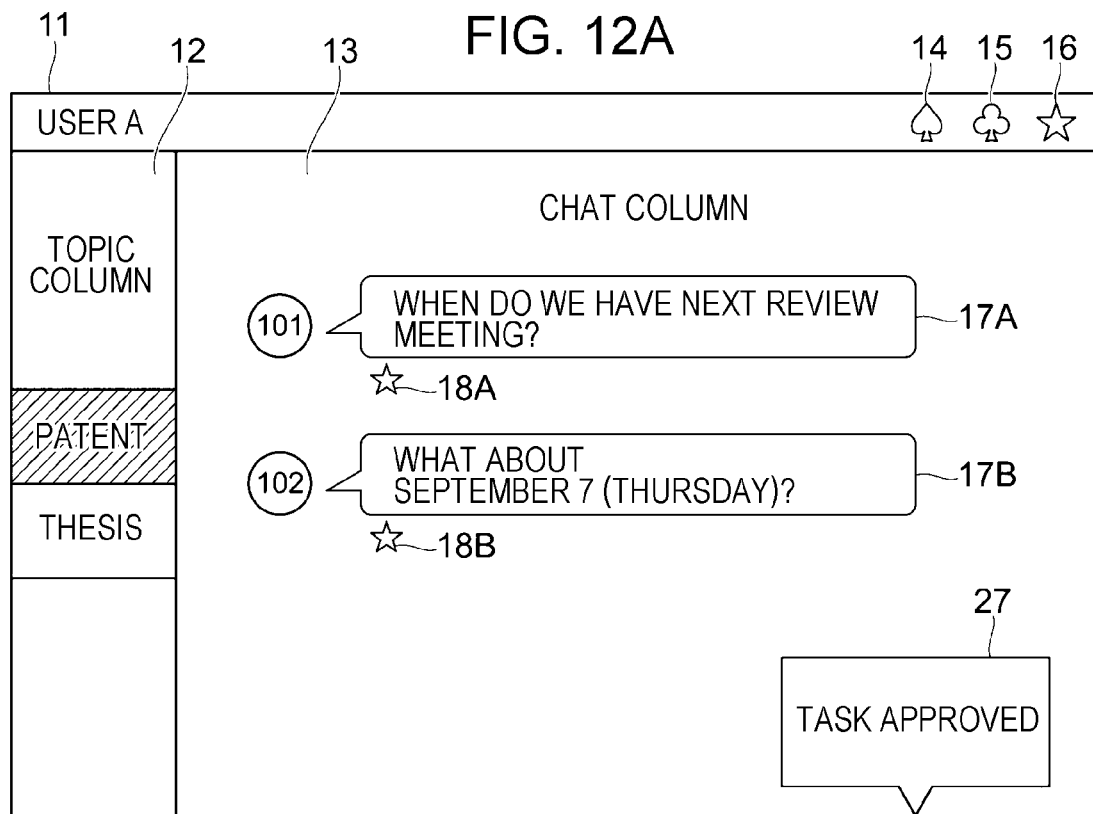
FIG. 12A and FIG. 12B illustrate examples of notification notifying that the task has been approved.
Figure 12B:
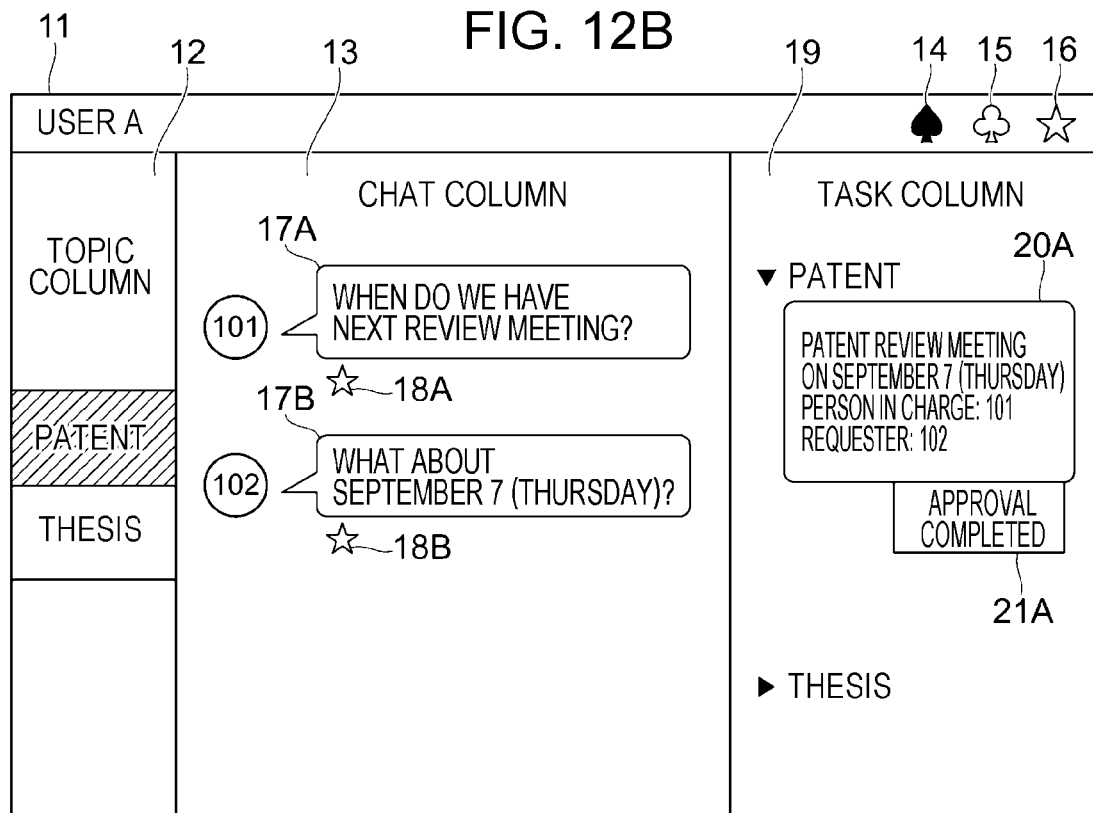

If the task status is changed to "approval completed", a notification that the task is approved is displayed on the chat screen 11 of the person in charge of the task. FIG. 12A and FIG. 12B illustrate examples of the notification that the task has been approved. If the task has been approved, a notification screen 27 indicating "task approved" is displayed in the chat column 13 on the chat screen 11 of the user as illustrated in FIG. 12A. If the user selects the notification image 27, the information on the task approved by the manager is displayed in the task column 19 as illustrated in FIG. 12B. In the illustrated example, "approval completed" is displayed in a status column 21A on the task image 20A.

In the example described above, the task is registered based on the message. A task may be registered based on a task that has been registered.

The task on the task image 20C of FIG. 10-2A is an individual task that has been registered with the user A being the person in charge. For example, the task image 20C is selected on the chat screen 11 of the user A, and another task with another user being a person in charge is registered. In this case, another task with another user being a person in charge is registered with the same task (work contents) as the task on the task image 20C.

The task image 20C may be selected, and the character string "September 7 deadline and presentation on September 16" may be modified. A different task with task contents different from the task of the task image 20C may be registered. In that case, the person in charge may be the person in charge of the task of the task image 20C or another user may be designated as the person in charge.

The task image 20C is displayed not only on the chat screen 11 of the user A but also on the chat screens 11 of other users who are participating in the topic "thesis". On the chat screens 11 of the other users as well, the task image 20C may be selected and another task may be registered. For example, on the user B's chat screen 11, another task may be selected, based on the task of the task image 20C. In such a case, another task with the user B serving as a person in charge is registered with the same task contents as those of the task of the task image 20C. Also, for example, another task with another user different from the user B may be registered. Another task with task contents different from those of the task of the task image 20C may be registered. In such a case, as well, the user B may be designated as the person in charge, or another user may be designated as the person in charge.

Based on an individual task of a user participating in the topic, a manager of another topic may register a task with another user participating in the topic designated as the person in charge, or may register a task with all participants of the topic designated as persons in change. In the example described above, based on the individual task of the user A, another task is registered. The present invention is not limited to this method in which another task is registered based on the individual task. For example, another task may be registered based on the task that a user has registered with another user designated as a person in charge.

Figure 13:
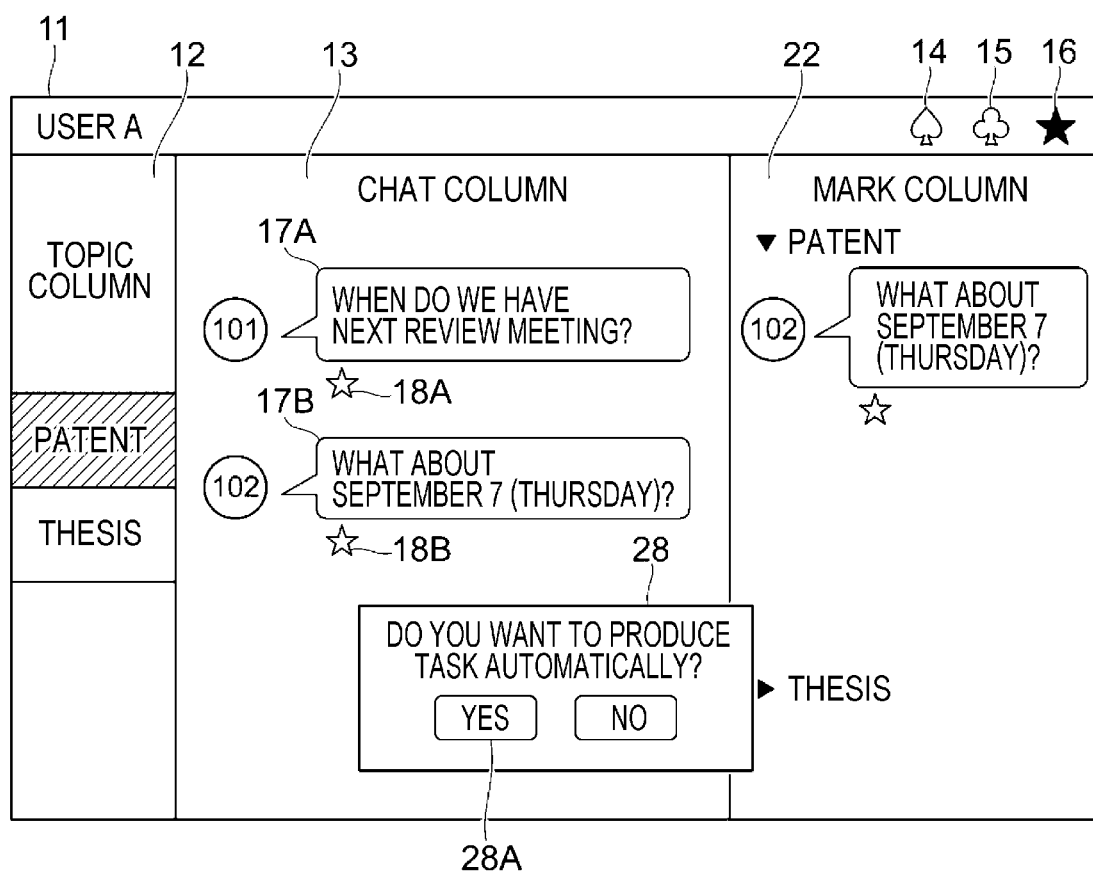
FIG. 13 illustrates an example of a process to register the task via selecting a mark button.

In the example described above, the user selects the mark button to mark the message. Through that operation, the task may be automatically registered. FIG. 13 illustrates an example of a process to register the task via selecting the mark button.

If the user A selects the mark button 18B in the message 17B, the same massage as the message 17B is displayed in the mark column 22, and an image 28 inquiring whether to register the task is displayed. If the user selects a yes button 28A, the task content generating unit 212 generates task contents. The task content generating unit 212 generates the task contents, based on the character string included in the message 17B. The task registration instruction unit 213 instructs the server apparatus 100 to register the task. If the task registration permission determination unit 115 in the server apparatus 100 permits the task to be registered, the task registration unit 116 registers the task.

As described above, the chat system 1 of the exemplary embodiment registers the task using not only the character string specified in a single message but also the character string specified in multiple messages when messages are exchanged with respect to a predetermined topic. When the task is registered, the predetermined character string is identified, based on the character string specified by the user or the message including the character string. The information that is a combination of the character string specified by the user and the predetermined character string is displayed as the task contents.

In the example described above, the messages are displayed in a chronological order on the chat screen. The display form of the messages is not limited to the chronological order arrangement. For example, the messages may be arranged in accordance with the degree of importance attached to the messages, or may be arranged on a per user basis of the users who have transmitted the messages.

In the example described above, the process from receiving the operation to register the task to displaying the registered task is performed using the functionalities of the operation terminal 200 of FIG. 3 and the server apparatus 100 of FIG. 4. The present invention is not limited to that configuration. For example, some (or all) of the functionalities of the operation terminal 200 of FIG. 3 may be implemented by the server apparatus 100 or some (or all) of the functionalities of the server apparatus 100 may be implemented by the operation terminal 200. For example, the server apparatus 100 may generate the task contents, and may notify the operation terminal 200 of the generated task contents. For example, the operation terminal 200 may determine whether to permit the task to be registered, and may register the task by storing the information on the task on the task DB 113.

In the example described above, the person in charge of the task is assigned to the task. The person in charge is not limited to a person who actually performs the task. The person in charge of the task may be simply related to the task. In accordance with the exemplary embodiment, the task may be understood as being related to work that is related to one or more users. The character string of the exemplary embodiment is not limited to a set of characters. The character string may be a single character.

A program implementing the exemplary embodiment of the present invention may be provided not only via communication but also by storing the program on a recording medium, such as a compact disk read-only memory (CD-ROM).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive an operation, using a character string that is specified by a plurality of messages included in a predetermined topic selected by a user, from the user to register a task that involves one or more users; and
display, as information on the task registered when the processor receives the operation from the user, the information that is a combination of the specified character string and a predetermined character string that is identified based on the specified character string or the messages.

2. The information processing apparatus according to claim 1, wherein the predetermined character string is a character string that is not included in the specified character string.

3. The information processing apparatus according to claim 2, wherein the predetermined character string is associated in advance with the messages or at least part of the specified character string.

4. The information processing apparatus according to claim 3, wherein the predetermined character string is a character string of the predetermined topic.

5. The information processing apparatus according to claim 1, wherein the messages are messages that have been transmitted by a first user from among users who are assigned to the predetermined topic in advance.

6. The information processing apparatus according to claim 5, wherein the messages are messages that have been transmitted by a second user different from the first user from among the users who are assigned to the predetermined topic in advance.

7. The information processing apparatus according to claim 1, wherein if a first task involving a first user is registered using character strings of the messages, registering a second task involving the first user using the messages is inhibited.

8. The information processing apparatus according to claim 7, wherein if the first user who has performed the operation to register the first task is different from a second user who has performed the operation to register the second task, registering the second task is permitted.

9. The information processing apparatus according to claim 1, wherein if a first task involving a first user is registered using character strings of the messages, the receiving unit receives an operation that registers a second task, based on the first task.

10. The information processing apparatus according to claim 9, wherein if the first task involving the first user is registered using the character strings of the messages, the receiving unit receives an operation that registers the second task involving a second user and having contents identical to contents of the first task.

11. An information processing apparatus, comprising:
a display that displays on a predetermined display region a message as a display target from among messages transmitted with reference to a predetermined topic selected by a user; and
a display controller that performs control such that the message on the display region and information on a task related to the message are displayed in an associated manner.

12. The information processing apparatus according to claim 11, wherein the display controller performs control such that the message and the information on the task related to the message are displayed in juxtaposition.

13. The information processing apparatus according to claim 11, wherein the information on the task related to the message is information on the task that is produced based on the message.

14. The information processing apparatus according to claim 1, wherein the processor receives an editing of the information from the user that enters another character string into a region containing the information.

15. An information processing apparatus comprising:
a processor configured to:
receive an operation from a first user to select a message that has been transmitted and included in a first topic from among a plurality of predetermined topics; and receive an operation to identify a second user assigned to the first topic from among users assigned to the predetermined topics, based on the message selected by the first user, and to register a task involving the second user.

16. The information processing apparatus according to claim 15, wherein the processor receives an editing of the information from the first user that enters another character string into a region containing the information.

17. A non-transitory computer readable medium storing a program causing a computer to execute a process for processing information, the process comprising:

receiving an operation, using a character string that is specified by a plurality of messages included in a predetermined topic selected by a user, from the user to register a task that involves one or more users; and outputting data that is used to display, as information on the task registered when the operation is received from the user, the information that is a combination of the specified character string and a predetermined character string that is identified based on the specified character string or the messages.

18. The non-transitory computer readable medium storing the program causing the computer to execute the process according to claim 17, the process further comprising:

receiving an editing of the information from the user that enters another character string into a region containing the information.

\* \* \* \* \*